United States Patent
Tanaka et al.

(10) Patent No.: US 10,470,026 B2
(45) Date of Patent: Nov. 5, 2019

(54) NON-TRANSITORY COMPUTER-READABLE STORAGE MEDIUM, DATA TRANSFER DEVICE, AND DATA TRANSFER METHOD

(71) Applicant: FUJITSU LIMITED, Kawasaki-shi, Kanagawa (JP)

(72) Inventors: Miho Tanaka, Kawasaki (JP); Masataka Sonoda, Kawasaki (JP); Shunsuke Kikuchi, Shinagawa (JP); Noriyuki Fukuyama, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/618,178

(22) Filed: Jun. 9, 2017

(65) Prior Publication Data

US 2018/0007530 A1  Jan. 4, 2018

(30) Foreign Application Priority Data

Jun. 29, 2016  (JP) .................................. 2016-129122

(51) Int. Cl.
*H04W 8/00* (2009.01)
*H04L 29/08* (2006.01)
(Continued)

(52) U.S. Cl.
CPC ............. *H04W 8/005* (2013.01); *H04L 67/18* (2013.01); *H04W 4/80* (2018.02); *H04W 64/006* (2013.01); *H04W 84/18* (2013.01)

(58) Field of Classification Search
CPC ... H04W 8/005; H04W 4/008; H04W 64/006; H04W 84/18; H04L 67/18
See application file for complete search history.

(56) References Cited

U.S. PATENT DOCUMENTS 6,747,562 B2 * 6/2004 Giraldin .............. G07C 9/00111
                                                340/573.1
7,181,017 B1 * 2/2007 Nagel ................... H04L 9/0825
                                                380/282
(Continued)

FOREIGN PATENT DOCUMENTS

| EP | 3142090 | 3/2017 |
| JP | 2009-159336 | 7/2009 |
| WO | 2015/170538 | 11/2015 |

*Primary Examiner* — Qun Shen
(74) *Attorney, Agent, or Firm* — Fujitsu Patent Center

(57) ABSTRACT

A data transfer method includes: executing a process that stores sensor information including duplicate degrees and position information, the duplicate degrees indicating an amount of computers as transmission sources of inhibit signals received by the first computer; executing a process that transmits the inhibit signal including the duplicate degree in the sensor information to a computer that is present in a position to which direct communication via the short-distance radio communication is possible; executing a process that stores the duplicate degree in the inhibit signal, associates the duplicate degree with the transmission source of the inhibit signal, and increases the duplicate degree in the sensor information; and executing a process that transmits the position information in the sensor information to the management device in a case where the duplicate degree in the sensor information is higher than the duplicate degree associated with the transmission source of the inhibit signal.

9 Claims, 30 Drawing Sheets

(51) Int. Cl.
*H04W 64/00* (2009.01)
*H04W 4/80* (2018.01)
*H04W 84/18* (2009.01)

(56) References Cited

U.S. PATENT DOCUMENTS

| | | | | |
|---|---|---|---|---|
| 2003/0135541 | A1* | 7/2003 | Maeda | G06F 9/4862 709/202 |
| 2009/0201149 | A1* | 8/2009 | Kaji | G01C 21/20 340/539.13 |
| 2009/0201850 | A1* | 8/2009 | Davis | G01S 5/0009 370/328 |
| 2010/0280348 | A1* | 11/2010 | Wenzel | A61B 5/0452 600/365 |
| 2012/0008526 | A1* | 1/2012 | Borghei | H04W 4/021 370/254 |
| 2012/0080944 | A1* | 4/2012 | Recker | H02J 9/02 307/25 |
| 2014/0288551 | A1* | 9/2014 | Bharmi | A61N 1/36139 606/41 |
| 2016/0330825 | A1* | 11/2016 | Recker | H05B 37/0272 |

* cited by examiner

FIG. 8

RECEIVED BEACON TERMINAL POSITION INFORMATION TABLE 521

| DATA ID | BEACON TERMINAL ID | RECEIVING TIME | LATITUDE AND LONGITUDE | REGISTRATION PROCESSING STATE | DUPLICATE DEGREE |
|---|---|---|---|---|---|
| 1 | A | 08:05:12 | Xx1/yy1 | NOT TARGET | 1 |
| 2 | B | 08:05:13 | Xx2/yy2 | NOT YET REGISTERED | 2 |
| 3 | C | 08:05:13 | Xx3/yy3 | ALREADY REGISTERED | 1 |
| : | : | : | : | : | : |

INHIBIT INFORMATION TABLE — 522

| DATA ID | MOBILE TERMINAL ID | BEACON TERMINAL ID | DUPLICATE DEGREE |
|---|---|---|---|
| 1 | Y | B | 1 |
| 2 | Z | B | 1 |
| 3 | Z | A | 1 |
| 4 | Y | C | 1 |
| : | : | : | : |

| DATA ID | MOBILE TERMINAL ID | NEXT INHIBIT SIGNAL PREDICTED RECEIVING TIME | |
|---|---|---|---|
| | | INHIBIT SIGNAL NEXT RECEIVING TIME PREDICTION TABLE | 523 |
| 1 | y | 08:05:17 | 1001-1 |
| 2 | z | 08:05:18 | 1001-2 |
| : | : | : | |

FIG. 11

BEACON TERMINAL POSITION MANAGEMENT INFORMATION TABLE 621

| DATA ID | BEACON TERMINAL ID | REGISTRATION REQUEST MOBILE TERMINAL ID | LATITUDE AND LONGITUDE | RECEIVING TIME | REGISTRATION REQUEST ACCEPTANCE TIME |
|---------|--------------------|------------------------------------------|-------------------------|-----------------|----------------------------------------|
| 1 | A | z | Xx1/yy1 | 08:04:42 | 08:06:10 |
| 2 | B | x | Xx2/yy2 | 08:05:13 | 08:08:22 |
| 3 | C | y | Xx3/yy3 | 08:04:55 | 08:09:17 |
| ‥ | ‥ | ‥ | ‥ | ‥ | ‥ |

INHIBIT INFORMATION TABLE 2200

| DATA ID | MOBILE TERMINAL ID | BEACON TERMINAL ID | DUPLICATE DEGREE | POSITION RECORDING TIME |
|---|---|---|---|---|
| 1 | y | B | 1 | 08:05:12 |
| 2 | z | B | 1 | 08:05:13 |
| : | : | : | : | : |

INHIBIT SIGNAL NEXT RECEIVING TIME PREDICTION TABLE 2900

| DATA ID | MOBILE TERMINAL ID | NEXT INHIBIT SIGNAL PREDICTED RECEIVING TIME | MOVING SPEED |
|---|---|---|---|
| 1 | y | 08:05:17 | V1 |
| 2 | z | 08:05:18 | V2 |
| .. | .. | .. | .. |

2901-1
2901-2

NON-TRANSITORY COMPUTER-READABLE STORAGE MEDIUM, DATA TRANSFER DEVICE, AND DATA TRANSFER METHOD

CROSS-REFERENCE TO RELATED APPLICATION

This application is based upon and claims the benefit of priority of the prior Japanese Patent Application No. 2016-129122, filed on Jun. 29, 2016, the entire contents of which are incorporated herein by reference.

FIELD

The embodiments discussed herein are related to a non-transitory computer-readable storage medium, a data transfer device, and a data transfer method.

BACKGROUND

In the related art, there is a technique of transferring information of a sensor, which is received from the sensor, to a management device while attaching position information of the transferring device itself. As an example of the related art, there is a technique in which a base station terminal that is capable of acquiring position information by using a signal from a global positioning system (GPS) satellite searches for a short-distance radio communication apparatus that has identification information but does not have position information and that is capable of communication and the base station terminal determines whether the short-distance radio communication apparatus may be detected.

Examples of the related art include International Publication Pamphlet No. WO 2015170538.

SUMMARY

According to an aspect of the invention, a non-transitory computer-readable storage medium for storing a data transfer program that causes a first computer to execute a process is provided. The first computer is a computer among plural computers configured to communicate with a management device, communicate with a sensor via a short-distance radio communication, communicate with each other via short-distance radio communication, and identify present positions.

The processor of the first computer is configured to execute a process that includes: executing a first process that includes storing, in response to reception of identification information of the sensor, sensor information that includes duplicate degrees and position information, the duplicate degrees indicating an amount of computers as transmission sources of inhibit signals received by the first computer, the inhibit signal which inhibits other computers including the first computer from transmitting information of the sensor to the management device, the position information indicating a present position of the first computer; executing a second process that includes transmitting the inhibit signal that includes the duplicate degree in the sensor information to a computer among the plural computers that is present in a position to which direct communication via the short-distance radio communication is possible; executing a third process that includes storing, in response to reception of the inhibit signal that is output from a second computer as another computer among the plural computers, the duplicate degree that is included in the inhibit signal, associating the duplicate degree with the transmission source of the inhibit signal, and increasing the duplicate degree that is included in the sensor information; and executing a fourth process that includes transmitting the position information that is included in the sensor information to the management device in a case where the duplicate degree that is included in the sensor information is higher than the duplicate degree that is associated with the transmission source of the inhibit signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an explanatory diagram illustrating an example of contents stored in a received beacon terminal position information table;

FIG. 9 is an explanatory diagram illustrating an example of contents stored in an inhibit information table;

FIG. 10 is an explanatory diagram illustrating an example of contents stored in an inhibit signal next receiving time prediction table;

FIG. 11 is an explanatory diagram illustrating an example of contents stored in a beacon terminal position management information table;

FIG. 24 is an explanatory diagram illustrating an example of contents stored in an inhibit information table in Example 2-2;

FIG. 29 is an explanatory diagram illustrating an example of contents stored in an inhibit signal next receiving time prediction table in Example 3-2.

DESCRIPTION OF EMBODIMENTS

According to the related art, in a case where plural data transfer devices that receive information of a sensor are present, any of the plural data transfer devices may attempt to transfer the information of the sensor in order to reduce a communication amount. In such a case, the information of the sensor may be transferred from the data transfer device that is in a distant position from the sensor. For example, in a case where the data transfer device that is defined by identification information transfers the information of the sensor and where the data transfer device that is distant from the sensor becomes the defined data transfer device, the defined data transfer device transfers the information to a management device while attaching the position information of the defined data transfer device itself, and the position information of a position that is distant from the sensor is thus transferred. Then, the management device registers the position information of the position that is distant from the sensor as the position information of the sensor.

As one aspect of the present embodiment, provided are solutions for transferring received information of a sensor by a data transfer device that is in a close position to the sensor among plural data transfer devices that receive the information of the sensor.

Embodiments of a data transfer program, a data transfer device, and a data transfer method of the present disclosure are hereinafter described in detail with reference to drawings.

Figure 1:
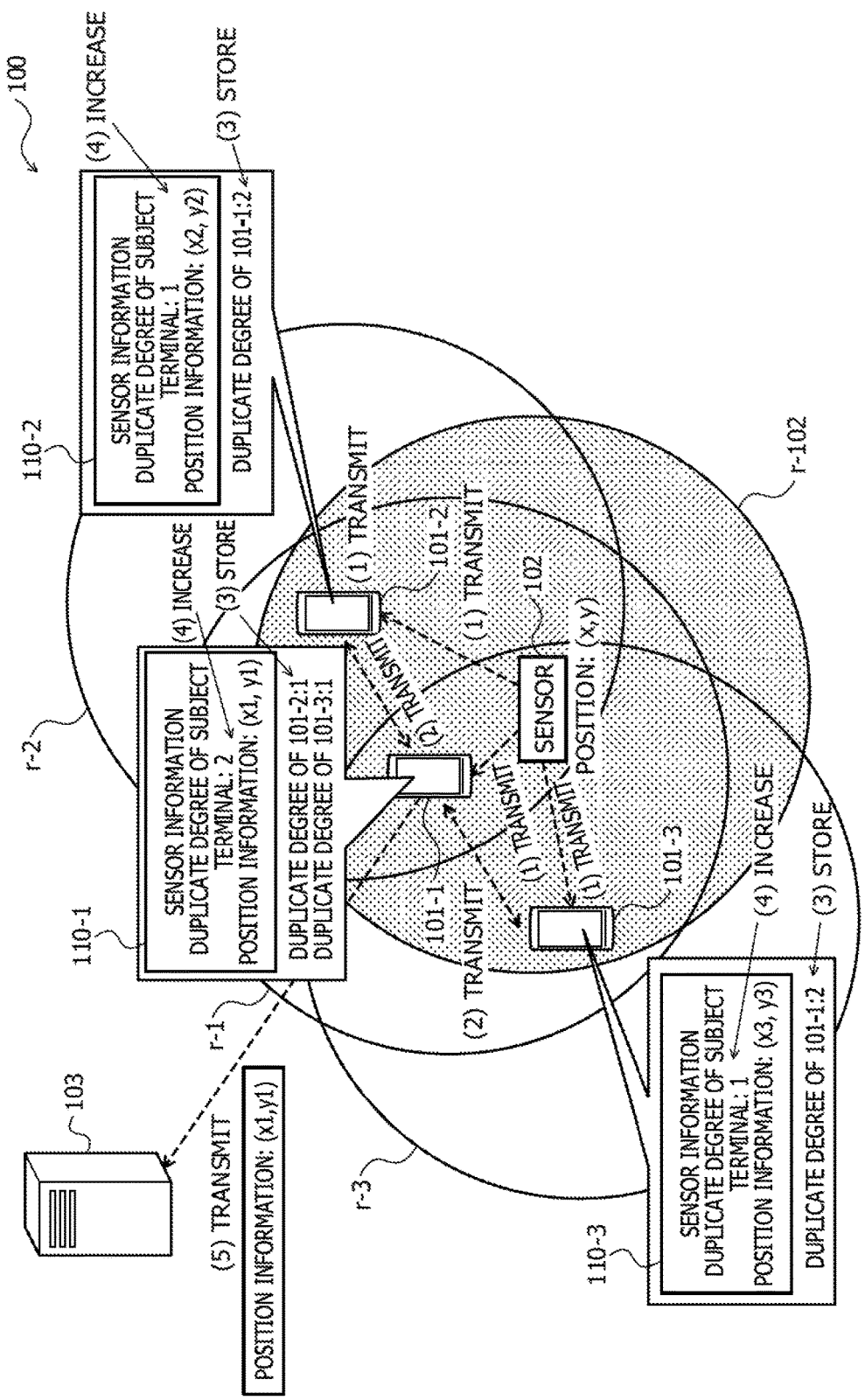
FIG. 1 is an explanatory diagram illustrating an exemplary operation of a data transfer device according to an embodiment.

FIG. 1 is an explanatory diagram illustrating an exemplary operation of a data transfer device 101 according to this embodiment. A system 100 illustrated in FIG. 1 includes plural data transfer devices 101, a sensor 102, and a management device 103. Each data transfer device 101 is a computer that transfers information which is received from the sensor 102 to the management device 103 while attaching position information of the data transfer device 101 itself. Further, the data transfer device 101 is capable of identifying a present position thereof by a GPS sensor. Further, the data transfer devices 101 perform direct communication with each other and with the sensor 102 via short-distance radio communication. Further, the data transfer devices 101 perform radio communication with the management device 103 via the data transfer device 101, a base station, or a radio access point (AP). Further, the same communication method or a different communication method may be used for the short-distance radio communication that is performed among the data transfer devices 101 and the short-distance radio communication that is performed by the data transfer devices 101 and the sensor 102.

Each data transfer device 101 freely moves between the base stations and the radio APs, and mutual relationships are not present among the data transfer devices 101. The data transfer device 101 is a smart phone, a cellular phone, or a portable terminal, for example. The sensor 102 is a device that does not have a function of identifying the present position and sends certain information as a signal. Further, in this embodiment, the sensor 102 freely moves but may be fixed to a certain place. For example, the sensor 102 is a beacon terminal that sends information about a certain position. For example, in a case where the sensor 102 is a beacon terminal and where there is a person who has the beacon terminal, the beacon terminal sends identification information (identifier (ID)) of the beacon terminal as information about the position of the person. The management device 103 is a server in a data center (DC), for example.

The system 100 may provide four services that are described below, for example. A first service is a service in which for persons who climb a certain mountain, an application which performs this embodiment is installed in the data transfer device 101 carried by an adult, a child carries the sensor 102, and the location of the child in the mountain is thereby monitored. Further, a second service is a service in which in a certain school route, a child who commutes to a school carries the sensor 102, the application which performs this embodiment is installed in the data transfer device 101 carried by a guardian in the school route, and the location of the child in the school route is thereby monitored. Further, a third service is a service in which the sensor 102 is provided to an article not desired to be lost, the application which performs this embodiment is installed in the data transfer device 101 carried by a person who seeks the above-described article, and the above-described article is thereby sought in a case where the above-described article is lost. Further, a fourth service is a service in which in a factory, the sensor 102 is provided to an article not desired to be lost, the application which performs this embodiment is installed in the data transfer device 101 carried by a worker in the factory, and the above-described article is thereby sought in a case where the above-described article is lost.

Here, a device that transfers data of the sensor 102 communicates with the management device 103 in order to transmit a registration request. However, because a communication fee is charged for communication from the device that transfers the data of the sensor 102 to the management device 103, it may be desired to save the communication as much as possible. Thus, a method is possible in which each of the devices that transfer the data for the sensor 102 broadcasts an inhibit signal for registration to the management device 103 via the short-distance radio communication and which device transmits the registration request to the management device 103 is decided based on the IDs included in the inhibit signals. The device that is decided by this method is secured with registration of position information instead of inhibiting the other devices.

However, the above-described method may cause a case where if three or more devices that transfer the data of the sensor 102 are present in a signal reaching range of one sensor 102, the devices in positions in which those may not directly transmit or receive a signal to each other may transmit the registration requests to the management device 103 in a duplicate manner. In a case where any of the plural devices that transfer the data may attempt to transfer the information of the sensor 102 in order to reduce the communication amount, a device that is other than the device in the closest position to the sensor 102, that is, the device that is distant from the sensor 102 may perform transfer. Because the data transfer device in the closest position to the sensor 102 among the plural devices that transfer the data may not be determined, a case may be assumed where the device that is defined by the identification information may transfer the information of the sensor 102, for example. In this case, the device that is distant from the sensor 102 may become the defined device. In this case, because the defined device performs transfer to the management device 103 while attaching the position information of the defined device itself, the defined device transfers not the position information of the closer device to the sensor 102 but the position information of the position that is distant from the sensor 102. Further, the management device 103 assumes the received position information as the position information of the sensor 102 and thus registers the position information of the position that is distant from the sensor 102 as the position information of the sensor 102.

Accordingly, in this embodiment, a description is made about a case where the data transfer devices 101 transmit the inhibit signals for position registration of the sensor 102 to each other and the data transfer device 101 whose duplicate degree as the number of transmission sources of the received inhibit signals is highest registers the position information to the management device 103.

An exemplary operation of the data transfer device 101 is described with reference to FIG. 1. The system 100 illustrated in FIG. 1 has data transfer devices 101-1 to 101-3 as the plural data transfer devices 101. Further, signal reaching ranges of the data transfer devices 101-1 to 101-3 and the sensor 102 are set as r-1 to r-3 and r-102, respectively. The reaching range of a signal that is sent by the sensor 102 and the reaching range of a signal of the data transfer device 101 may be the same or different. However, in this embodiment, it is assumed that the reaching ranges are set the same for simplicity of description. In FIG. 1, shading is applied to the inside of r-102 for easy understanding of the drawing.

Further, it is assumed that the data transfer devices 101-1 to 101-3 and the sensor 102, which are illustrated in FIG. 1, are positioned in (x1, y1), (x2, y2), (x3, y3), and (x, y), respectively. As illustrated in FIG. 1, the data transfer device 101 in the closest position to the position (x, y) of the sensor 102 is the data transfer device 101 in the position of (x1, y1). Accordingly, in the system 100 illustrated in FIG. 1, registration of (x1, y1) is desired.

As indicated by (1) in FIG. 1, the sensor 102 transmits the ID of the sensor 102 via the short-distance radio communication. In the example of FIG. 1, the data transfer devices 101-1 to 101-3 that are present in the signal reaching range r-102 receive the ID of the sensor 102.

The data transfer devices 101-1 to 101-3 that receive the ID of the sensor 102 respectively store sensor information 110-1 to 110-3 that includes the duplicate degrees and position information which indicates present positions of the data transfer devices 101-1 to 101-3 themselves. Here, the duplicate degree represents the number of the data transfer devices 101 as the transmission sources of the inhibit signals in a case where the data transfer device 101 itself receives the inhibit signals. Accordingly, the duplicate degree indicates that, as the value of the duplicate degree becomes higher, the device which corresponds to the duplicate degree is present in the signal reaching ranges of the more data transfer devices 101. Further, the duplicate degree may be set as a value that indicates that, as the value of the duplicate degree becomes lower, the device which corresponds to the duplicate degree is present in the signal reaching ranges of the more data transfer devices 101. Further, the position information is information that indicates the position which is identified by the GPS sensor. For example, the position information is information that is a combination of a latitude and a longitude.

The inhibit signal is a signal that inhibits another computer than the transmission source from transmitting the position information of the sensor 102 to the management device 103. Because the data transfer devices 101-1 to 101-3 do not receive the inhibit signal at a time point when the ID of the sensor 102 is received, the duplicate degrees of the data transfer devices 101-1 to 101-3 are zero. Further, the data transfer devices 101-1 to 101-3 respectively manage the duplicate degrees of the data transfer devices 101-1 to 101-3 themselves and the duplicate degrees of the other data transfer devices 101 that are included in the received inhibit signals. In the description of FIG. 1, the duplicate degree included in the sensor information 110 is referred to as "the duplicate degree of the subject terminal". Meanwhile, the duplicate degree of the other data transfer device 101 that is included in the received inhibit signal is referred to as "the duplicate degree of the other terminal".

As indicated by (2) in FIG. 1, each of the data transfer devices 101-1 to 101-3 transmits the inhibit signal that includes the duplicate degree which is included in the sensor information 110 of each of the data transfer devices 101-1 to 101-3 themselves to the data transfer devices 101 that are present in positions to which direct communication is possible via the short-distance radio communication among the data transfer devices 101-1 to 101-3. In the example of FIG. 1, the data transfer device 101-1 transmits the inhibit signal to the data transfer devices 101-2 and 101-3. Further, the data transfer devices 101-2 and 101-3 transmit the inhibit signals to the data transfer device 101-1. Further, a timing for transmitting the inhibit signal may be any timing. For example, the data transfer devices 101-1 to 101-3 periodically transmit the inhibit signals at the time when the ID of the sensor 102 is received for the first time as a trigger. Further, the data transfer devices 101-1 to 101-3 may change the intervals at which the inhibit signals are transmitted based on remaining battery charges of the data transfer devices 101-1 to 101-3 themselves.

In a case where the inhibit signal is received, each of the data transfer devices 101-1 to 101-3 stores the duplicate degree included in the received inhibit signal while associating the duplicate degree with the transmission source of the inhibit signal and increases the duplicate degree included in the sensor information 110. Specifically, as indicated by (3) in FIG. 1, the data transfer device 101-1 stores the duplicate degree included in the inhibit signal that is received from the data transfer device 101-2 while associating the duplicate degree with the data transfer device 101-2. The duplicate degree stored while being associated with the data transfer device 101-2 becomes the duplicate degree of the other terminal. Further, as indicated by (4) in FIG. 1, the data transfer device 101-1 increases the duplicate degree of the subject terminal by one. Here, as for the duplicate degree included in the inhibit signal that is received from the data transfer device 101-2, the duplicate degree included in the inhibit signal that is received for the first time is zero. However, the duplicate degree of the data transfer device 101-2 itself increases by one by receiving the inhibit signal from the data transfer device 101-1, and the duplicate degree included in the inhibit signal that is received after the duplicate degree of the data transfer device 101-2 itself increases becomes one.

FIG. 1 illustrates the sensor information 110-1 to 110-3 and the values of duplicate degrees of the other terminals than the data transfer devices 101-1 to 101-3 themselves, the values being managed by the data transfer devices 101-1 to 101-3, which indicate final states. Specifically, the duplicate degree of the data transfer device 101-1 itself, which is included in the sensor information 110-1, becomes two because the inhibit signals are received from the data transfer devices 101-2 and 101-3. Similarly, the duplicate degrees of the data transfer devices 101-2 and 101-3 themselves, which are included in the sensor information 110-2 and 110-3, become one because each of the data transfer devices 101-2 and 101-3 receives the inhibit signal from the data transfer device 101-1.

Then, in a case where the duplicate degrees included in the sensor information 110 of the data transfer devices 101-1 to 101-3 themselves are higher than the duplicate degree that is associated with the transmission source of the inhibit signal, the data transfer devices 101-1 to 101-3 transmit the position information included in the sensor information 110 to the management device 103. As illustrated in FIG. 1, only in the data transfer device 101-1 among the data transfer devices 101-1 to 101-3, the duplicate degree included in the sensor information 110 of each of the data transfer devices 101-1 to 101-3 themselves is higher than the duplicate degree that is associated with the transmission source of the inhibit signal. Here, because the data transfer device 101 is closer to the position of the sensor 102 as the duplicate degree is higher, the data transfer device 101 whose duplicate degree is highest is positioned closest to the sensor 102. Further, a timing for comparing the duplicate degree of the subject terminal with the duplicate degrees of the other terminals in order to transmit the position information may be any timing. For example, the data transfer devices 101-1 to 101-3 may compare the duplicate degrees of the subject terminals with the duplicate degrees of the other terminals periodically or in a case of transmitting the inhibit signal predetermined times and may determine whether or not to transmit the position information included in the sensor information 110.

Accordingly, as indicated by (5) in FIG. 1, the data transfer device 101-1 transmits position information (x1, y1) included in the sensor information 110-1 to the management device 103. The management device 103 registers the received position information (x1, y1) as the position information of the sensor 102.

Consequently, the position (x1, y1) of the data transfer device 101 that is present in the closest position to the position (x, y) of the sensor 102 is registered to the management device 103, and accuracy of the position information may thus be secured. Further, the data transfer devices 101-1 to 101-3 may restrain occurrence of redundant communication in which the devices in positions in which those may not directly transmit or receive a signal to each other transmit the registration requests to the management device 103 in a duplicate manner.

Next, an exemplary configuration where the system 100 is applied is described with reference to FIG. 2.

Figure 2:
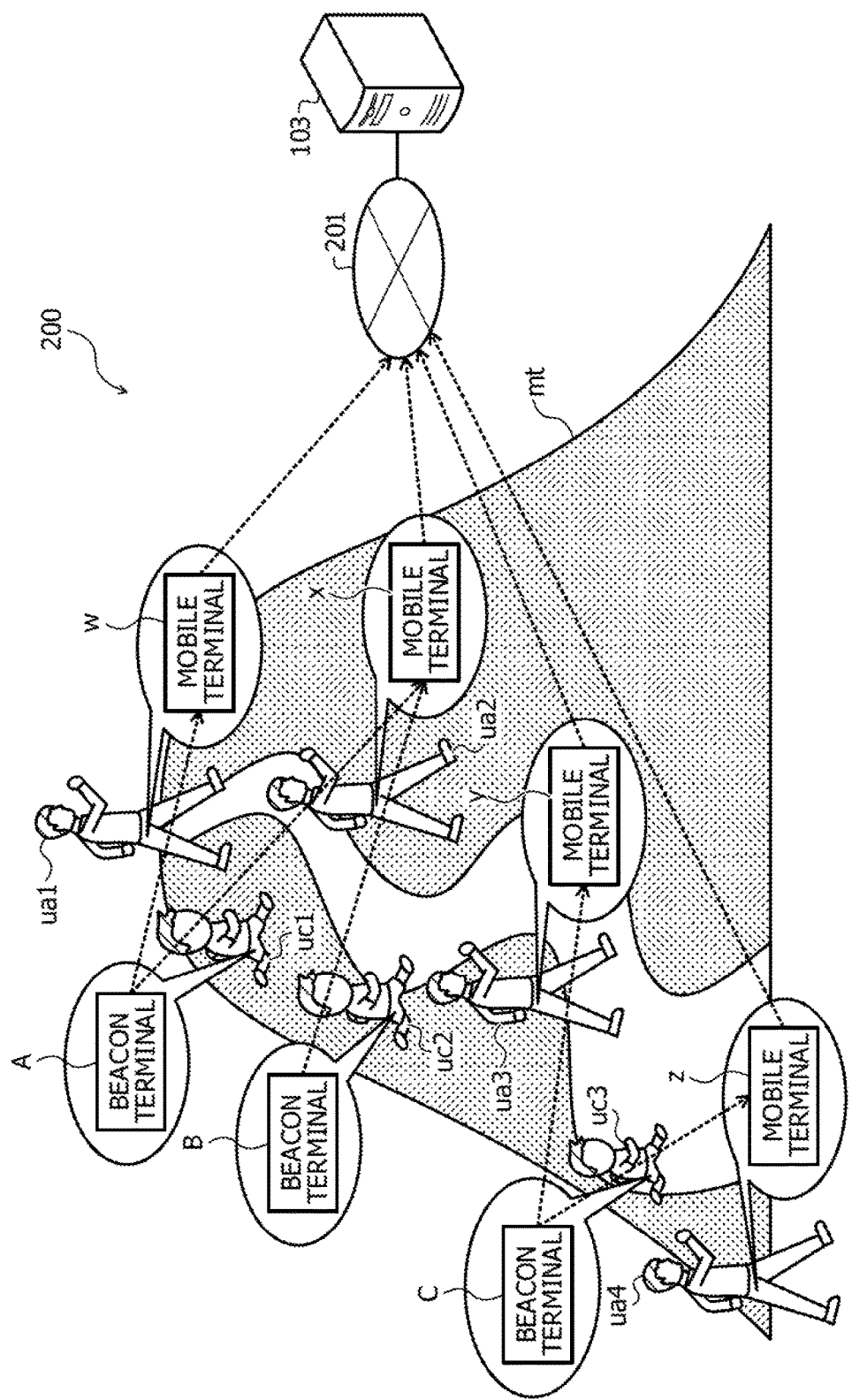
FIG. 2 is an explanatory diagram illustrating an exemplary configuration of a system.

FIG. 2 is an explanatory diagram illustrating an exemplary configuration of a system 200. The system 200 is a service that is provided for person who climbs a certain mountain mt. The system 200 has the management device 103, mobile terminals w to z, and beacon terminals A to C. Here, the mobile terminals w to z correspond to the data transfer devices 101 illustrated in FIG. 1. Further, the beacon terminals A to C correspond to the sensor 102 illustrated in FIG. 1. The mobile terminals w to z are coupled to the management device 103 via a network 201.

As illustrated in FIG. 2, adults ua1 to ua4 have the respective mobile terminals w to z, and children uc1 to uc3 have the respective beacon terminals A to C. The adults ua1 to ua4 and the children uc1 to uc3 move independently from each other. The system 200 provides a service of monitoring locations of the children uc1 to uc3. Next, a hardware configuration of a mobile terminal x is described with reference to FIG. 3, and a hardware configuration of the management device 103 is described with reference to FIG. 4.

(Exemplary Hardware Configuration of Mobile Terminal x)

Figure 3:
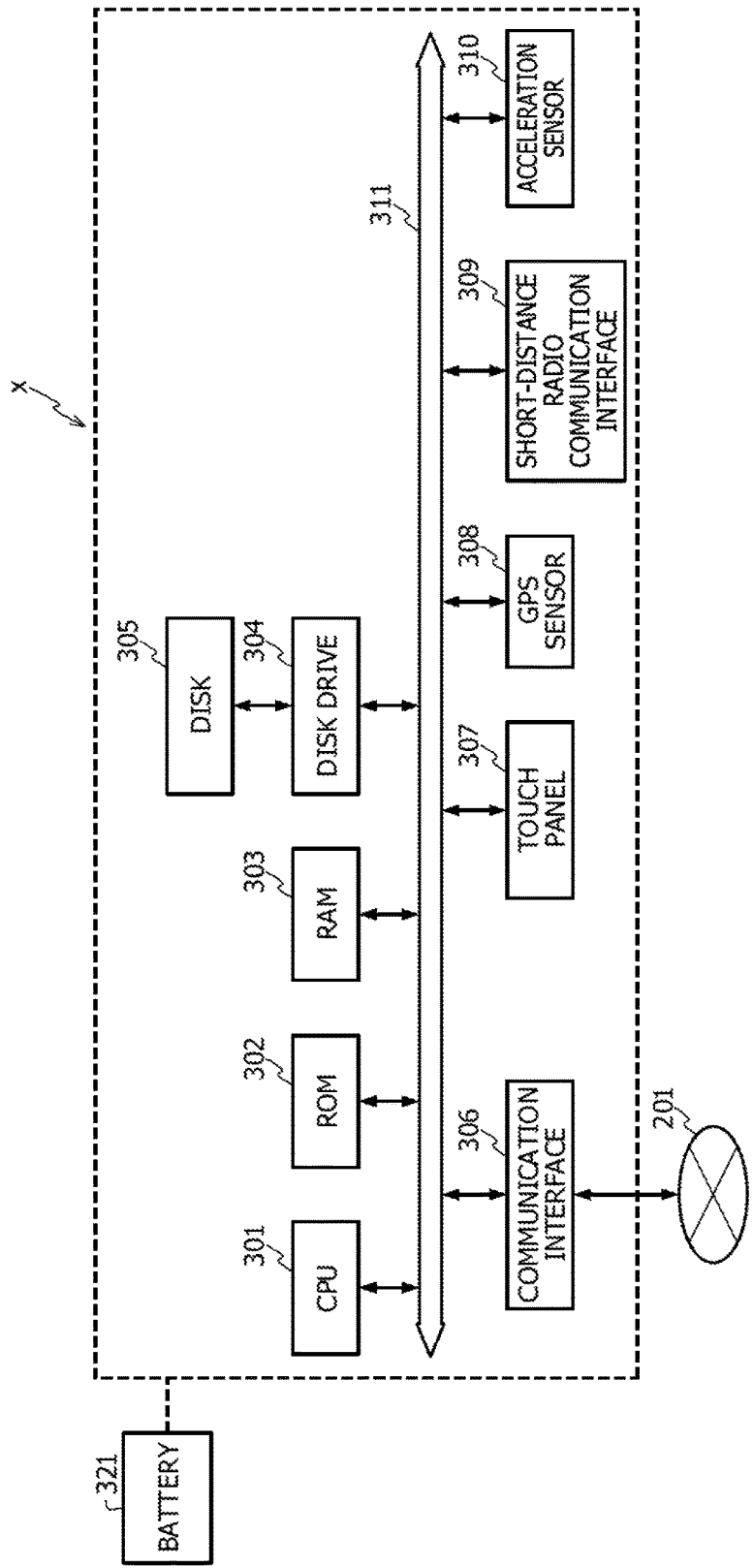
FIG. 3 is an explanatory diagram illustrating an exemplary hardware configuration of a mobile terminal x.

FIG. 3 is an explanatory diagram illustrating an exemplary hardware configuration of the mobile terminal x. Although FIG. 3 illustrates the exemplary hardware configuration of the mobile terminal x, the mobile terminals w, y, and z have similar hardware configurations to the mobile terminal x. In FIG. 3, the mobile terminal x has a central processing unit (CPU) 301, a read only memory (ROM) 302, a random access memory (RAM) 303, a disk drive 304, and a disk 305. In addition, the mobile terminal x has a communication interface 306, a touch panel 307, a GPS sensor 308, a short-distance radio communication interface 309, an acceleration sensor 310, and a battery 321. Further, the CPU 301 to the disk drive 304 and the communication interface 306 to the acceleration sensor 310 are coupled together by a bus 311.

Here, the CPU 301 is a computation processing device that conducts control of the whole mobile terminal x. The ROM 302 is a non-volatile memory that stores programs such as a boot program. The RAM 303 is a volatile memory that is used as a work area of the CPU 301. The disk drive 304 is a control device that controls reading and writing of data with respect to the disk 305 while following control by the CPU 301. The disk 305 stores data that are written by the control by the disk drive 304. As the disk drive 304, a solid-state drive or the like may be employed, for example. In a case where the disk drive 304 is a solid-state drive, a semiconductor memory that is formed of a semiconductor element, a so-called semiconductor disk, may be employed as the disk 305.

The communication interface 306 is a control device that conducts an interface between the network 201 and internal portions and controls inputs and outputs of data from other devices. Specifically, the communication interface 306 is coupled to other devices via the network 201 through a communication line.

The touch panel 307 is a device in which a sensor which detects a tap operation or a flick operation by the adult ua1 is combined with a display which displays a cursor, an icon, or a toolbox, and data such as a document, an image, and function information. Specifically, the sensor is arranged by being superposed on the display. Further, the sensor is a sensor that employs a resistive membrane scheme or a capacitive scheme such as a surface type or a projection type, for example. As the display, a thin film transistor (TFT) liquid crystal display or the like may be employed, for example.

The GPS sensor 308 is a sensor that receives a signal from a GPS satellite and thereby obtains the position information of the mobile terminal x. The short-distance radio communication interface 309 is a control device that controls inputs and outputs of data from the beacon terminals A to C which are present in short distances. For example, the short-distance radio communication interface 309 is coupled to another mobile terminal or a beacon terminal by Bluetooth® which is one of standards of the short-distance radio communication, Near Field Communication (NFC®), ZigBee®, or the like. The acceleration sensor 310 is a sensor that detects the acceleration of the mobile terminal x. Specifically, the acceleration sensor 310 detects the accelerations in three axis directions that are orthogonal to each other. The battery 321 supplies power to the CPU 301 to the bus 311 that are surrounded by broken lines indicated in FIG. 3.

(Exemplary Hardware Configuration of Management Device 103)

Figure 4:
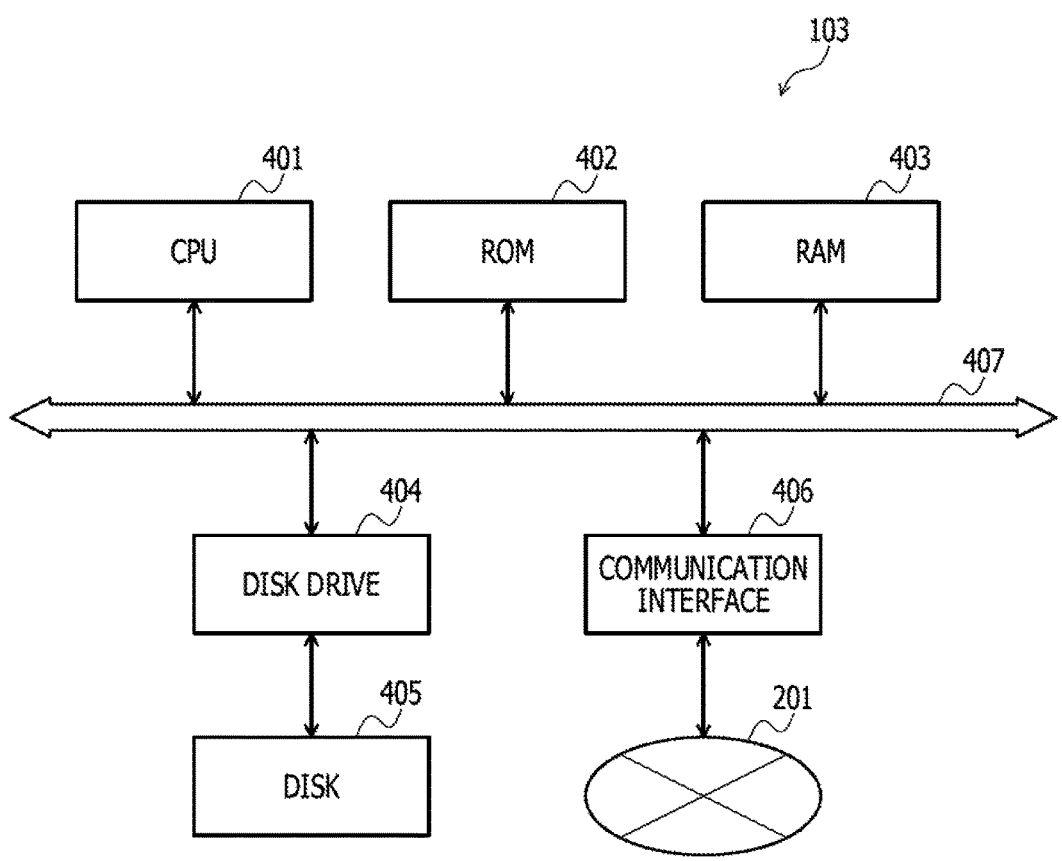
FIG. 4 is an explanatory diagram illustrating an exemplary hardware configuration of a management device.

FIG. 4 is an explanatory diagram illustrating an exemplary hardware configuration of the management device 103. In FIG. 4, the management device 103 includes a CPU 401, a ROM 402, and a RAM 403. Further, the management device 103 includes a disk drive 404, a disk 405, and a communication interface 406. Further, the CPU 401 to the disk drive 404 and the communication interface 406 are coupled together by a bus 407.

The CPU 401 is a computation processing device that conducts control of the whole management device 103. The ROM 402 is a non-volatile memory that stores programs such as a boot program. The RAM 403 is a volatile memory that is used as a work area of the CPU 401.

The disk drive 404 is a control device that controls reading and writing of data with respect to the disk 405 while following control by the CPU 401. As the disk drive 404, a magnetic disk drive, an optical disk drive, a solid-state drive, or the like may be employed, for example. The disk 405 is a non-volatile memory that stores data which are written by the control by the disk drive 404. For example, in a case where the disk drive 404 is a magnetic disk drive, a magnetic disk may be employed as the disk 405. Further, in a case where the disk drive 404 is an optical disk drive, an optical disk may be employed as the disk 405. Further, in a case where the disk drive 404 is a solid-state drive, a semiconductor memory that is formed of a semiconductor element, a so-called semiconductor disk, may be employed as the disk 405.

The communication interface 406 is a control device that conducts an interface between the network 201 and internal portions and controls inputs and outputs of data from other devices. Specifically, the communication interface 406 is coupled to other devices via the network 201 through a communication line. As the communication interface 406, a modem, a local area network (LAN) adapter, or the like may be employed, for example.

Further, in a case where a manager of the management device 103 directly operates the management device 103, the management device 103 may have hardware such as a display, a keyboard, and a mouse.

Although not particularly illustrated, a hardware configuration of the beacon terminals A to C has a short-distance radio communication interface that is capable of communication with the mobile terminal w to z, a microcontroller unit (MCU), a battery, and so forth. Next, as functions of the mobile terminals w to z, functions of the mobile terminal x are described with reference to FIG. 5.

(Exemplary Functional Configuration of Mobile Terminal x)

Figure 5:
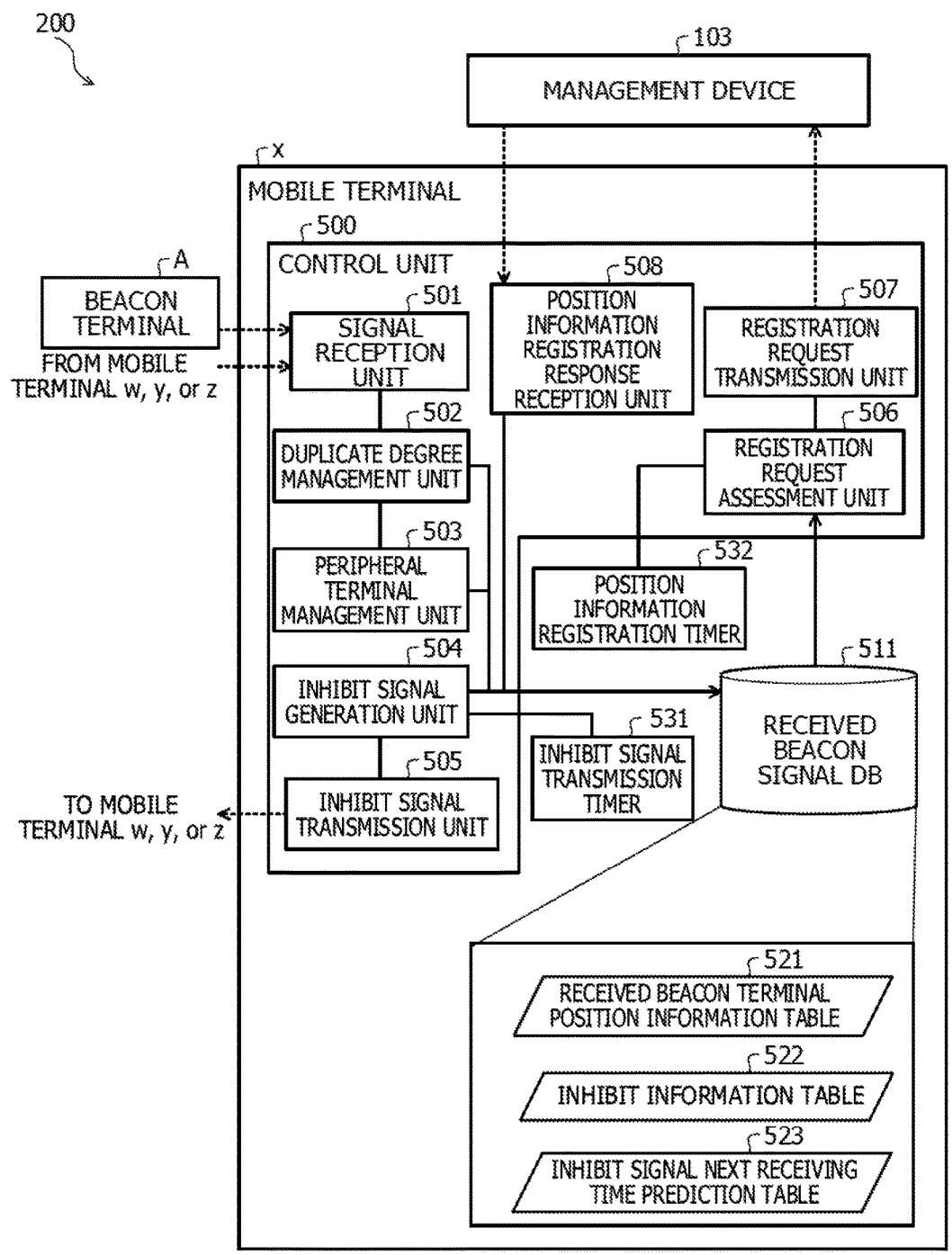
FIG. 5 is an explanatory diagram illustrating an exemplary functional configuration of the mobile terminal x.

FIG. 5 is an explanatory diagram illustrating an exemplary functional configuration of the mobile terminal x. Although FIG. 5 illustrates the exemplary functional configuration of the mobile terminal x, the mobile terminals w, y, and z have similar functional configurations to the mobile terminal x. The mobile terminal x has a control unit 500. The control unit 500 includes a signal reception unit 501, a duplicate degree management unit 502, a peripheral terminal management unit 503, an inhibit signal generation unit 504, an inhibit signal transmission unit 505, a registration request assessment unit 506, a registration request transmission unit 507, and a position information registration response reception unit 508. The control unit 500 realizes functions of the units by execution of programs stored in a storage device by the CPU 301. Specifically, the storage device is the ROM 302, the RAM 303, the disk 305, or the like, which is illustrated in FIG. 3, for example. Further, processing results of the units are stored in the RAM 303, a register of the CPU 301, a cache memory of the CPU 301, or the like. Note that the broken line arrows indicated in FIG. 5 represent transmission of signals to the other devices.

Further, the data transfer device 101 is capable of accessing a received beacon signal database (DB) 511. The received beacon signal DB 511 is stored in the storage device such as the RAM 303 or the disk 305. Further, the received beacon signal DB 511 includes a received beacon terminal position information table 521, an inhibit information table 522, and an inhibit signal next receiving time prediction table 523.

The received beacon terminal position information table 521 is a table that stores the duplicate degree of the subject terminal and the present position in which a beacon signal is received. In a case where the beacon signals are received from plural beacon terminals, the received beacon terminal position information table 521 stores the duplicate degree of the subject terminal with respect to the beacon terminal and the present position in which the beacon signal of the beacon terminal is received for each of the beacon terminals. The received beacon terminal position information table 521 corresponds to the sensor information 110 illustrated in FIG. 1. An example of contents stored in the received beacon terminal position information table 521 is illustrated in FIG. 8.

The inhibit information table 522 is a table that stores the duplicate degree of the other terminal. The inhibit information table 522 stores, with respect to each of combinations of the terminals and the beacon terminals, the duplicate degree of the beacon signal of the beacon terminal of the combination. An example of contents stored in the inhibit information table 522 is illustrated in FIG. 9.

The inhibit signal next receiving time prediction table 523 is a table that stores a time when the other terminal next transmits the inhibit signal. An example of contents stored in the inhibit signal next receiving time prediction table 523 is illustrated in FIG. 10.

Further, the mobile terminal x has an inhibit signal transmission timer 531 and a position information registration timer 532. The inhibit signal transmission timer 531 is a timer that measures an interval of transmission of the inhibit signals. Further, the position information registration timer 532 is a timer that measures an interval of transmission of the registration requests. The inhibit signal transmission timer 531 and the position information registration timer 532 may be hardware timers or may be software timers.

Figure 7:
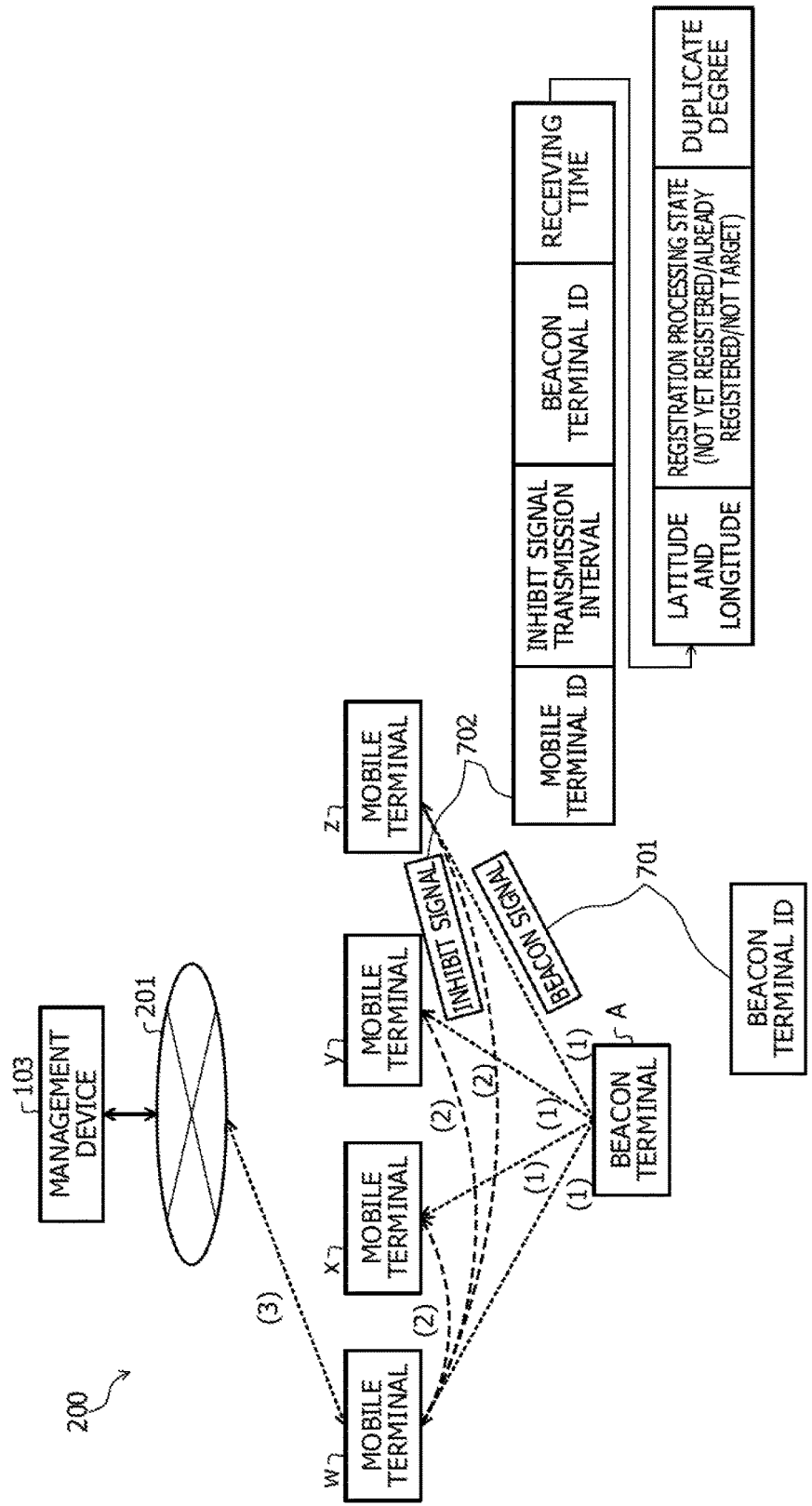
FIG. 7 is an explanatory diagram illustrating an example of a format of signals transmitted and received among devices.

Here, this embodiment includes three Examples, which are generally categorized. First, functions of Example 1 are described. The signal reception unit 501 receives the beacon signals from the beacon terminals A to C. An example of a format of the beacon signals is illustrated in FIG. 7. Further, the signal reception unit 501 receives the inhibit signals from the mobile terminals w, y, and z. An example of a format of the inhibit signals is illustrated in FIG. 7.

The duplicate degree management unit 502 manages the duplicate degree of subject terminal and the duplicate degree of the other terminal by using the received beacon terminal position information table 521 and the inhibit information table 522. Specifically, in a case where the signal reception unit 501 receives the beacon signal, the duplicate degree management unit 502 sets the duplicate degree of the subject terminal as zero and stores the position information that indicates the present position of the subject terminal in the received beacon terminal position information table 521. Here, the duplicate degree management unit 502 identifies the position information that indicates the present position of the subject terminal from the GPS sensor 308. However, embodiments are not limited to this. For example, as other methods, the duplicate degree management unit 502 may identify the position information that indicates the present position of the subject terminal by the intensity of an electric wave received from the base station, position information transmitted from the AP of Wireless Fidelity (Wi-Fi®), or the combination of those.

Further, in a case where the inhibit signal is received, the duplicate degree management unit 502 stores the duplicate degree included in the received inhibit signal in the inhibit information table 522 while associating the duplicate degree with the transmission source of the inhibit signal and increases the duplicate degree of the subject terminal that is included in the received beacon terminal position information table 521.

Here, as described with the inhibit signal generation unit 504, the inhibit signal may include a time interval for transmission of the inhibit signals. In this case, the duplicate degree management unit 502 receives the inhibit signal and identifies the time for receiving the next inhibit signal to the inhibit signal that is identified based on the time interval included in the received inhibit signal. Specifically, the duplicate degree management unit 502 identifies the time that results from the addition of the time interval included in the first inhibit signal to the time when the first inhibit signal is received as the time when the second inhibit signal as the next inhibit signal to the first inhibit signal is received. Then, in a case where the next inhibit signal is not received even if the identified time has passed, the duplicate degree management unit 502 decreases the duplicate degree of the subject terminal included in the received beacon terminal position information table 521.

The peripheral terminal management unit 503 manages peripheral terminals by using the inhibit signal next receiving time prediction table 523. Specifically, the peripheral terminal management unit 503 stores the time for receiving the next inhibit signal, which is identified by the duplicate degree management unit 502, in the inhibit signal next receiving time prediction table 523 while associating the time for receiving the next inhibit signal with the transmission source of the inhibit signal.

The inhibit signal generation unit 504 generates the inhibit signal that includes the duplicate degree included in the received beacon terminal position information table 521. For example, the inhibit signal generation unit 504 sets a certain time interval for the inhibit signal transmission timer 531 when the beacon signal is received. Then, the inhibit signal generation unit 504 generates the inhibit signal in a case where the inhibit signal transmission timer 531 expires. Further, the inhibit signal generation unit 504 may allow the inhibit signal to include a time interval for transmitting the inhibit signal in addition.

The inhibit signal transmission unit 505 transmits the inhibit signal that is generated by the inhibit signal generation unit 504 to the mobile terminal among the mobile terminals w, y, and z that is present in a position in which direct communication by the short-distance radio communication interface 309 is possible.

The registration request assessment unit 506 assesses whether or not the duplicate degree of the subject terminal included in the received beacon terminal position information table 521 is higher than the duplicate degree of the other terminal included in the inhibit information table 522.

Further, in a case where the duplicate degree of the subject terminal included in the received beacon terminal position information table 521 and the duplicate degree of the other terminal included in the inhibit information table 522 are the same value, the registration request assessment unit 506 assesses whether or not the ID of the subject terminal is greater than the ID of the other terminal. A method for assessing the magnitudes of the two IDs may be assessment by a numerical order or may be assessment by a lexical order. Further, any method may be used as long as each of the ID of the subject terminal and the ID of the other terminal may be identified. For example, the ID of the subject terminal and the ID of the other terminal may be individual identification information or media access control (MAC) addresses, for example.

In a case where the registration request assessment unit 506 assesses that the duplicate degree of the subject terminal is higher, the registration request transmission unit 507 transmits the registration request that includes the position information included in the received beacon terminal position information table 521 to the management device 103. Further, also in a case where the registration request assessment unit 506 assesses that the duplicate degree of the subject terminal is the same as the duplicate degree of the other terminal and the ID of the subject terminal is greater than the ID of the other terminal, the registration request transmission unit 507 transmits the registration request to the management device 103. In this embodiment, in a case where the duplicate degree of the subject terminal is the same as the duplicate degree of the other terminal and where the ID of the subject terminal is greater than the ID of the other terminal, the registration request is transmitted. However, embodiments are not limited to this because it is sufficient that an assessment reference is the same for each of the mobile terminals. For example, in a case where the duplicate degree of the subject terminal is the same as the duplicate degree of the other terminal, the registration request may be transmitted in a case where the ID of the subject terminal is less than the ID of the other terminal.

The position information registration response reception unit 508 receives a response to the registration request from the management device 103. For example, the position information registration response reception unit 508 receives a content of the registration request transmitted by the management device 103 or a signature that ensures correctness of a transmitter of the position information.

Next, functions of Example 2 are described. Example 2 is an example where duplication of the registration requests may be restrained even in a case where the mobile terminals repeat approach and separation and gathering. A more specific description of Example 2 is made with reference to FIG. 21 to FIG. 25. The same functions as Example 1 are not described.

In a case where the next inhibit signal is not received even if the time for receiving the next inhibit signal has passed and after the duplicate degree of the subject terminal included in the received beacon terminal position information table 521 is compared with the duplicate degree of the other terminal, the duplicate degree management unit 502 decreases the duplicate degree of the subject terminal. Here, the decrease may be performed at any time after the duplicate degree of the subject terminal is compared with the duplicate degree of the other terminal. For example, the duplicate degree management unit 502 may decrease the duplicate degree of the subject terminal in a case where the next inhibit signal is not received and immediately after the duplicate degree of the subject terminal is compared with the duplicate degree of the other terminal. Further, the inhibit signal may include the time when the transmission source of the inhibit signal receives the beacon signal. In this case, the duplicate degree management unit 502 may decrease the duplicate degree of the subject terminal in a case where the next inhibit signal is not received, after the duplicate degree of the subject terminal is compared with the duplicate degree of the other terminal, and in a case where the time that results from the addition of a certain time interval T to the time included in the inhibit signal has passed.

Further, as a method for decreasing the duplicate degree of the subject terminal, for example, the duplicate degree management unit 502 decreases the duplicate degree of the subject terminal included in the received beacon terminal position information table 521 at a time point when the next inhibit signal is assessed as not received even if the time for receiving the next inhibit signal has passed. Then, the duplicate degree management unit 502 relates the duplicate degree of the subject terminal that is not yet decreased with the duplicate degree of the subject terminal that is decreased. Next, after the next inhibit signal is assessed as not received even if the time for receiving the next inhibit signal has passed and when the duplicate degree of the subject terminal is compared with the duplicate degree of the other terminal, the duplicate degree management unit 502 uses the duplicate degree of the subject terminal that is not yet decreased as the duplicate degree of the subject terminal. Then, after the duplicate degree of the subject terminal is compared with the duplicate degree of the other terminal, the duplicate degree management unit 502 deletes the duplicate degree of the subject terminal that is not yet decreased.

Example 3 is an example where duplication of the registration requests may be restrained even in a case where the mobile terminal that moves at a high speed is present. A more specific description of Example 3 is made with reference to FIG. 26 to FIG. 30. The same functions as Example 1 are not described.

Figure 28:
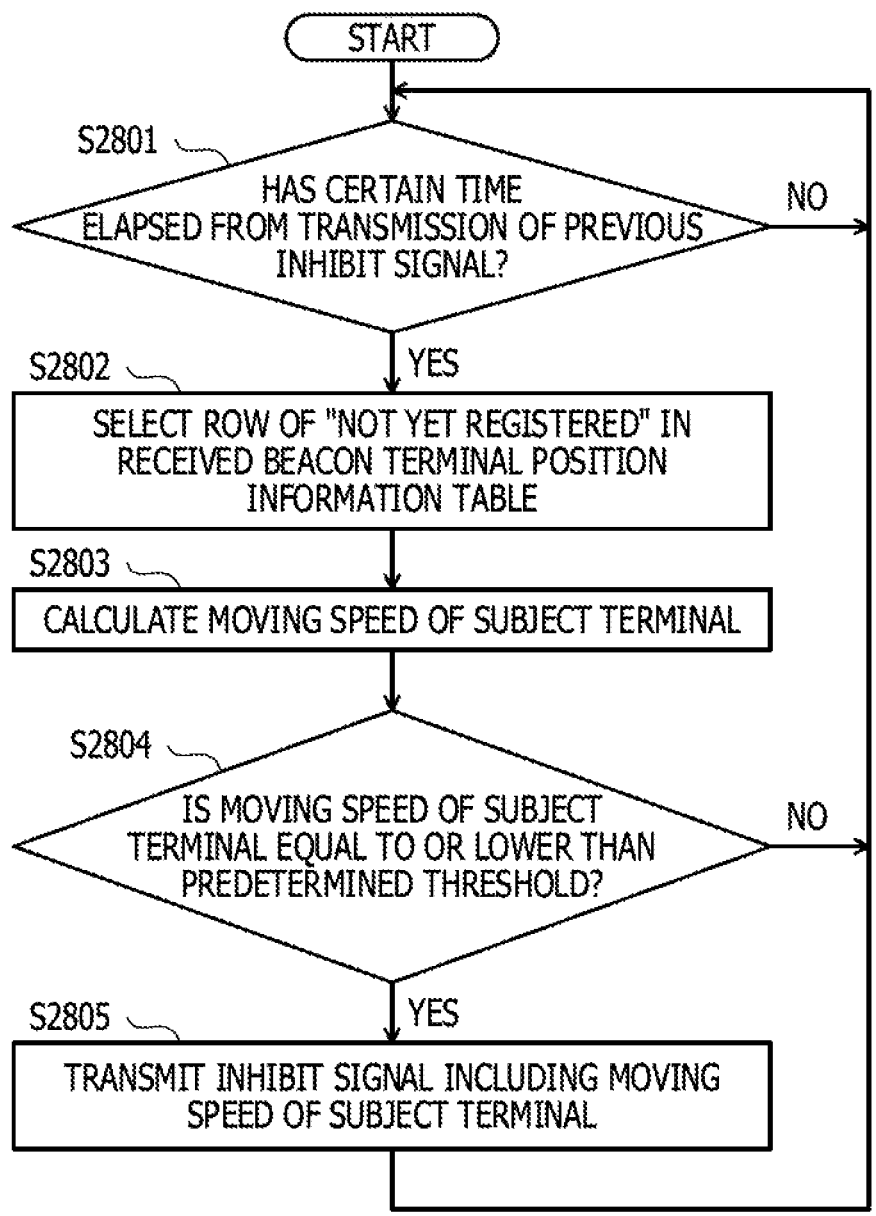
FIG. 28 is a flowchart illustrating an example of inhibit signal transmission process procedures in Example 3-1.
Figure 30:
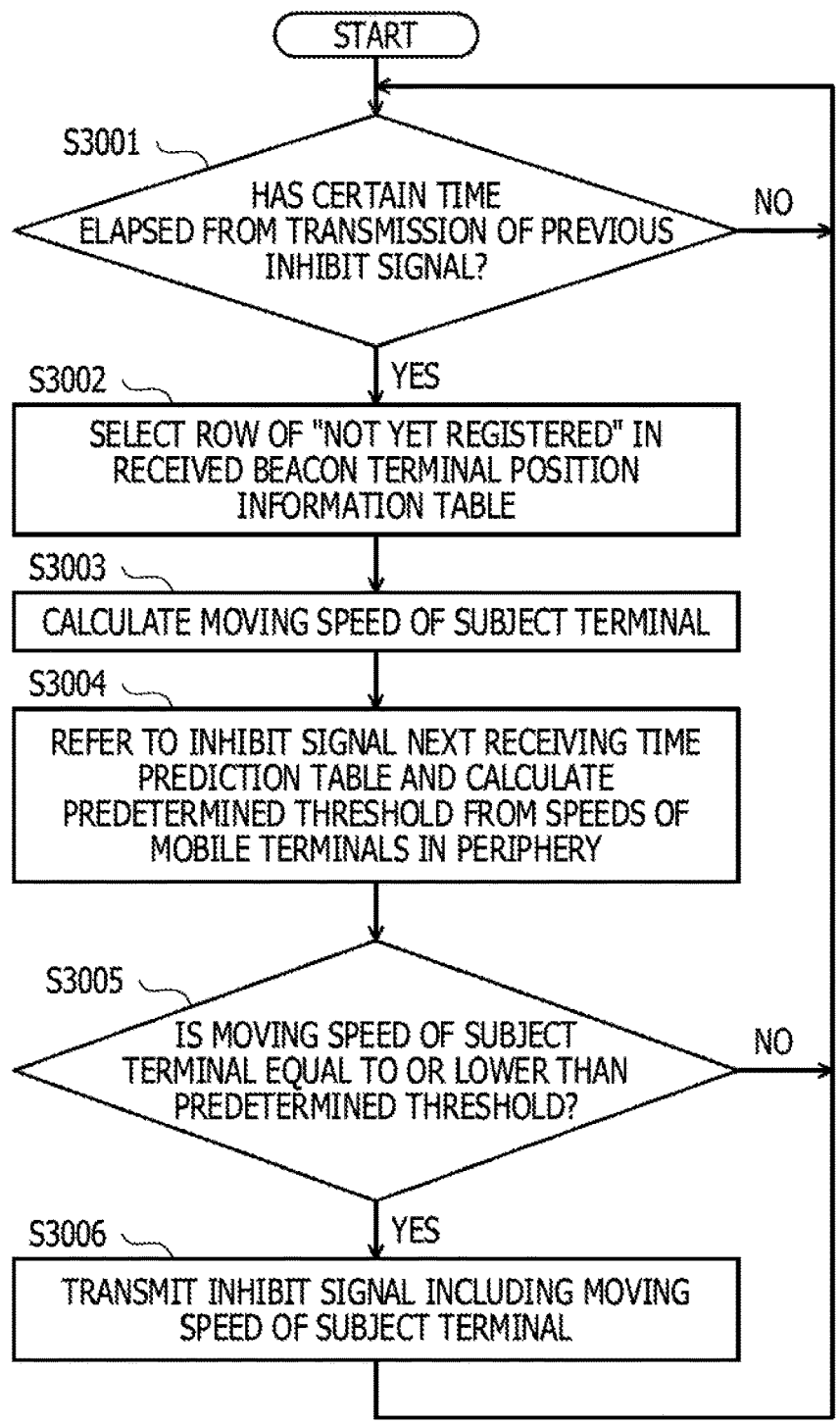
FIG. 30 is a flowchart illustrating an example of inhibit signal transmission process procedures in Example 3-2.

In a case where the moving speed of the subject terminal is higher than a predetermined threshold, the inhibit signal generation unit 504 does not generate the inhibit signal. On the other hand, in a case where the moving speed of the subject terminal is equal to or lower than the predetermined threshold, the inhibit signal generation unit 504 generates the inhibit signal. A method for setting the predetermined threshold is illustrated in FIG. 28. Further, the inhibit signal may further include the moving speed of the transmission source of the inhibit signal. In this case, the inhibit signal generation unit 504 calculates the predetermined threshold based on the moving speed included in the inhibit signal. A specific calculation method is illustrated in FIG. 30.

Figure 6:
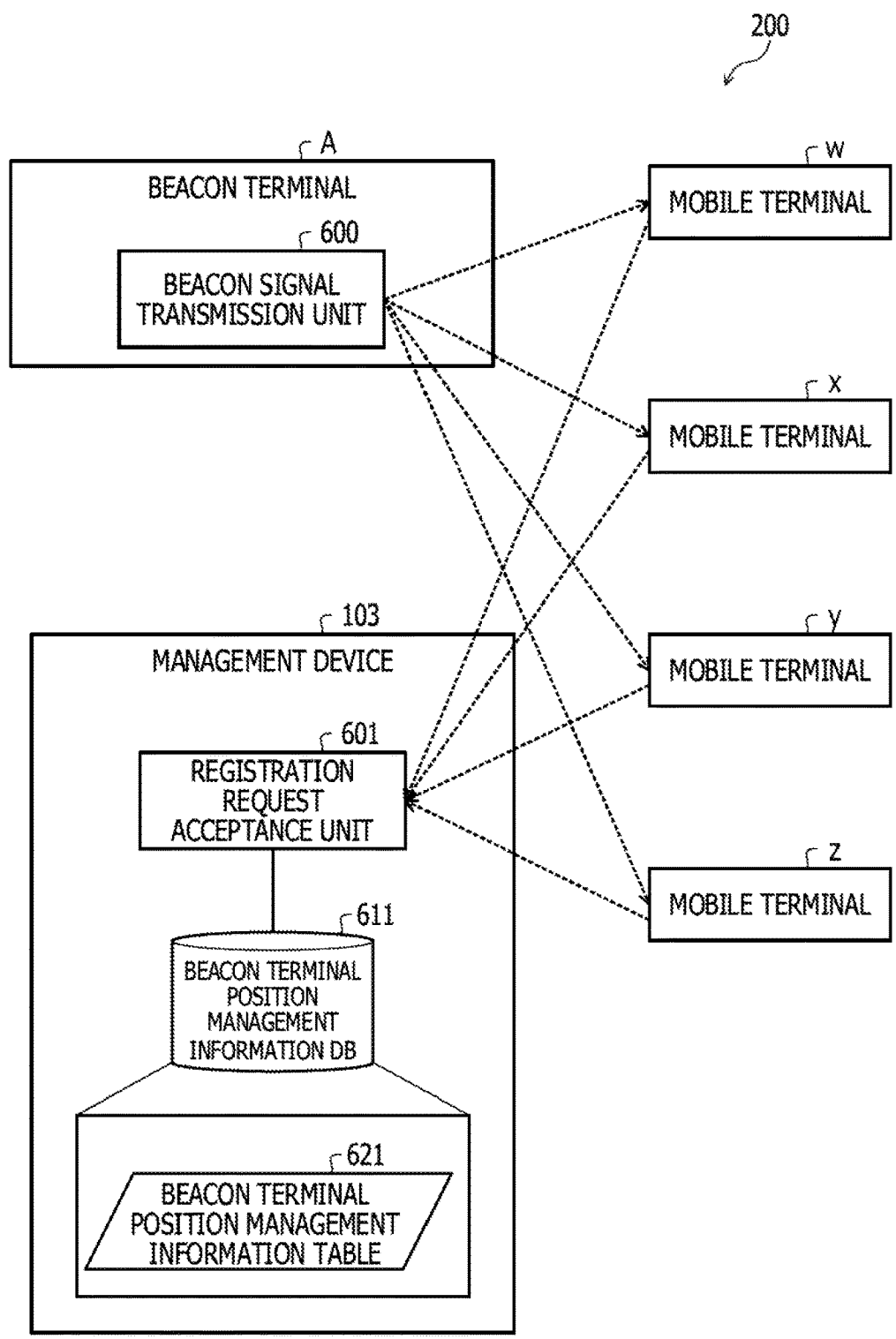
FIG. 6 is an explanatory diagram illustrating exemplary functional configuration of each of a beacon terminal A and the management device.

FIG. 6 is an explanatory diagram illustrating exemplary functional configuration of the beacon terminal A and the management device 103. Although FIG. 6 illustrates a functional configuration of the beacon terminal A, the beacon terminals B and C have similar functional configurations to the beacon terminal A. The beacon terminal A has a beacon signal transmission unit 600. The management device 103 has a registration request acceptance unit 601. The registration request acceptance unit 601 realizes functions of the units by execution of programs stored in a storage device by the CPU 401. Specifically, the storage device is the ROM 402, the RAM 403, the disk 405, or the like, which is illustrated in FIG. 4, for example. Further, processing results of the units are stored in the RAM 403, a register of the CPU 401, a cache memory of the CPU 401, or the like. Note that the broken line arrows indicated in FIG. 6 represent transmission of signals to the other devices.

Further, the management device 103 is capable of accessing a beacon terminal position management information DB 611. The beacon terminal position management information DB 611 is stored in the storage device such as the RAM 403 or the disk 405. Further, the beacon terminal position management information DB 611 includes a beacon terminal position management information table 621. The beacon terminal position management information table 621 is a table for managing the position of the beacon terminal. An example of contents stored in the beacon terminal position management information table 621 is illustrated in FIG. 11.

The beacon signal transmission unit 600 periodically performs transmission to the mobile terminal that is present in a position in which communication is possible via the short-distance radio communication.

In a case where the registration requests are accepted from the mobile terminal w to z, the registration request acceptance unit 601 stores the position information included in the accepted registration requests as the position information of the beacon terminals included in the accepted registration requests in the beacon terminal position management information table 621.

Example 1

Next, Example 1 is described with reference to FIG. 7 to FIG. 20.

FIG. 7 is an explanatory diagram illustrating an example of a format of signals that are transmitted and received among the devices. FIG. 7 illustrates an exemplary operation of the system 200 while illustrating the format of the signals transmitted by the beacon terminal, the mobile terminals w to z, and the management device 103. Although the beacon terminal A is depicted in FIG. 7, the beacon terminals B and C perform similar operations to the beacon terminal A.

As indicated by (1) in FIG. 7, the beacon terminal A transmits a beacon signal 701. The beacon signal 701 has a beacon terminal identifier (ID) that identifies the beacon terminal. In the example of FIG. 7, the signals between the terminals are indicated by broken lines.

As indicated by (2) in FIG. 7, the mobile terminal that receives the beacon signal 701 from the beacon terminal A transmits an inhibit signal 702 to the other mobile terminals. In FIG. 7, the mobile terminal w transmits the inhibit signal 702 to the other mobile terminals x to z.

The inhibit signal 702 includes items that are a mobile terminal ID, an inhibit signal transmission interval, the beacon terminal ID, a receiving time, the latitude and longitude, a registration processing state, and the duplicate degree. The mobile terminal ID is information that identifies the mobile terminal as the transmission source. The inhibit signal transmission interval is a time interval for next transmitting the inhibit signal 702. The beacon terminal ID is the beacon terminal ID that is included in the received beacon signal 701. The receiving time and the latitude and longitude are the receiving time and the latitude and longitude at a time when the mobile terminal as the transmission source receives the beacon signal 701.

The registration processing state is a state that indicates whether or not the beacon terminal ID is registered to the management device 103. Specifically, the registration processing state includes "not yet registered" that indicates that the concerned beacon terminal ID is not yet registered, "already registered" that indicates that the concerned beacon terminal ID is registered, and "not target" that indicates that the mobile terminal as the transmission source does not register the concerned beacon terminal ID. The duplicate degree is the duplicate degree of the mobile terminal as the transmission source.

The mobile terminal periodically decides whether to register the beacon terminal ID to the management device 103 by using the duplicate degree. Then, as indicated by (3) in FIG. 7, in a case where a decision to register is made, the mobile terminal transmits the registration request that includes the beacon terminal ID and the latitude and longitude to the management device 103. Processes of (1) to (3) in FIG. 7 may be carried out at independent timings from each other.

Further, a uniquely identifiable value is set as each of the beacon terminal ID and the mobile terminal ID. Further, the management device 103 may use another value than the mobile terminal ID in a case of assessment about registration to a data registration device. For example, as data by which the mobile terminal may be uniquely decided, in a case where the position information is transmitted within certain five minutes as a predetermined interval, the management device 103 may select a new receiving time that is received within the five minutes. Further, a communication measure by which the mobile terminal transmits the inhibit signal 702 to the other mobile terminal may be the short-distance radio communication that is the same as the beacon signal 701 or may be different short-distance radio communication. Next, information that is stored by the mobile terminal is described with reference to FIG. 8 to FIG. 10.

FIG. 8 is an explanatory diagram illustrating an example of contents stored in the received beacon terminal position information table 521. The received beacon terminal position information table 521 illustrated in FIG. 8 has records 801-1 to 801-3. One record serves as information about one beacon signal.

The received beacon terminal position information table 521 includes fields that are a data ID, the beacon terminal ID, the receiving time, the latitude and longitude, the registration processing state, and the duplicate degree. An ID that identifies each of the records of the received beacon terminal position information table 521 is stored in a data ID field. The beacon terminal ID included in the beacon signal 701 is stored in a beacon terminal ID field. A value that represents the receiving time and values that represent the latitude and longitude at a time when the mobile terminal as the transmission source receives the beacon signal 701 are stored in a receiving time field and a latitude and longitude field. An identifier that indicates the registration processing state is stored in a registration processing state field. Here, the identifiers that are stored in the received beacon terminal position information table 521 include "registration target" that indicates that the subject terminal is to subsequently perform the registration request of the concerned beacon terminal ID, other than "not yet registered", "already registered", and "not target" illustrated in FIG. 7. The duplicate degree with respect to the concerned beacon terminal ID is stored in a duplicate degree field.

As described above, the duplicate degree included in the received beacon terminal position information table 521 is the duplicate degree of the subject terminal that has the received beacon terminal position information table 521.

FIG. 9 is an explanatory diagram illustrating an example of contents stored in the inhibit information table 522. The inhibit information table 522 illustrated in FIG. 9 has records 901-1 to 901-4.

The inhibit information table 522 includes fields that are the data ID, the mobile terminal ID, the beacon terminal ID, and the duplicate degree. An ID that identifies each of the records of the inhibit information table 522 is stored in the data ID field. The mobile terminal ID as the transmission source that transmits the inhibit signal 702 is stored in a mobile terminal ID field. The beacon terminal ID included in the inhibit signal 702 is stored in the beacon terminal ID field. The duplicate degree included in the inhibit signal 702 is stored in the duplicate degree field.

As described above, the duplicate degree included in the inhibit information table 522 is the duplicate degree of the other terminal that is present in a periphery of the mobile terminal which stores the inhibit information table 522.

FIG. 10 is an explanatory diagram illustrating an example of contents stored in the inhibit signal next receiving time prediction table 523. The inhibit signal next receiving time prediction table 523 illustrated in FIG. 10 has records 1001-1 and 1001-2.

The inhibit signal next receiving time prediction table 523 includes fields that are the data ID, the mobile terminal ID, and a next inhibit signal predicted receiving time. An ID that identifies each of the records of the inhibit signal next receiving time prediction table 523 is stored in the data ID field. The mobile terminal ID is stored in the mobile terminal ID field. A value that represents a predicted time when the inhibit signal is next received from the mobile terminal which is indicated by the mobile terminal ID field is stored in a next inhibit signal predicted receiving time field.

Next, information that is stored by the management device 103 is described with reference to FIG. 11.

FIG. 11 is an explanatory diagram illustrating an example of contents stored in the beacon terminal position management information table 621. The beacon terminal position management information table 621 illustrated in FIG. 11 has records 1101-1 to 1101-3.

The beacon terminal position management information table 621 includes fields that are the data ID, the beacon terminal ID, a registration request mobile terminal ID, the latitude and longitude, the receiving time, and a registration request acceptance time. An ID that identifies each of the records of the beacon terminal position management information table 621 is stored in the data ID field. The beacon terminal ID included in the registration request is stored in the beacon terminal ID field. The mobile terminal ID that transmits the registration request is stored in a registration request mobile terminal ID field. Values that represent the latitude and longitude included in the registration request are stored in the latitude and longitude field. A value that represents the receiving time included in the registration request is stored in the receiving time field. A value that represents a time when the registration request is accepted is stored in a registration request acceptance time field.

Next, a sequence diagram illustrating an exemplary operation for reducing duplicate registrations in Example 1 is described with reference to FIG. 12.

Figure 12:
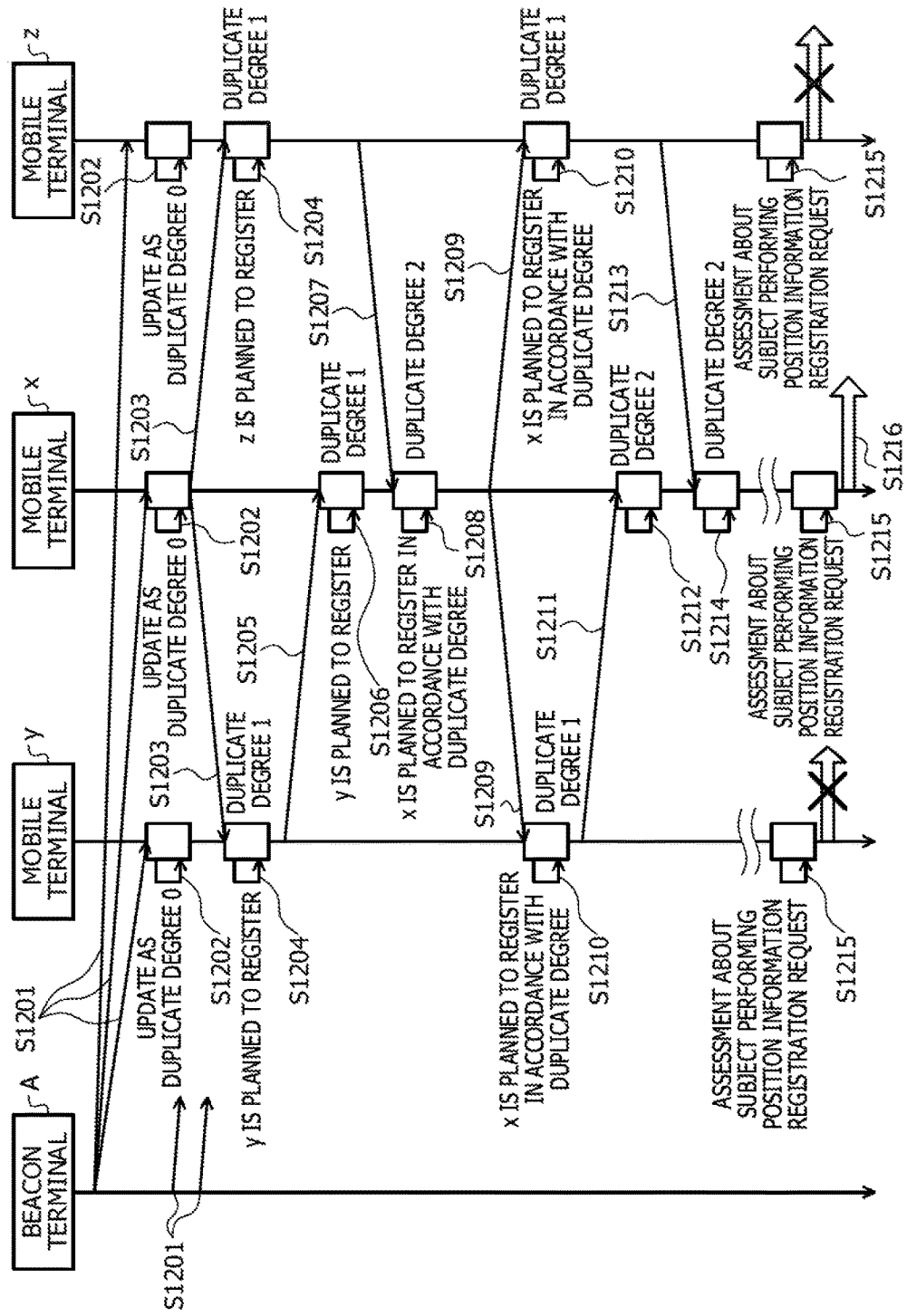
FIG. 12 is a sequence diagram illustrating an exemplary operation for reducing duplicate registrations in Example 1.

FIG. 12 is a sequence diagram illustrating an exemplary operation for reducing duplicate registrations in Example 1. In FIG. 12, it is assumed that the positional relationships among the mobile terminals x to z and the beacon terminal A are the same as the positional relationships among the data transfer devices 101-1 to 101-3 and the sensor 102 in FIG. 1. Further, it is assumed that the mobile terminals x to z are present in the signal reaching range of the beacon terminal A. Further, it is assumed that the mobile terminals y and z among the mobile terminals x to z may not directly communicate with each other. The mobile terminals x to z calculate the duplicate degrees in a case where the inhibit signal 702 is received, mutually transmit and receive the calculated duplicate degrees, and thereby decide one mobile terminal that performs the registration request. In FIG. 12, for simplicity of description, a description is made by using only the beacon terminal A among the beacon terminals A to C. In addition, it is assumed that the duplicate degree of the mobile terminal, which is mentioned, is the duplicate degree of the beacon terminal A in the mobile terminal.

Figure 14:
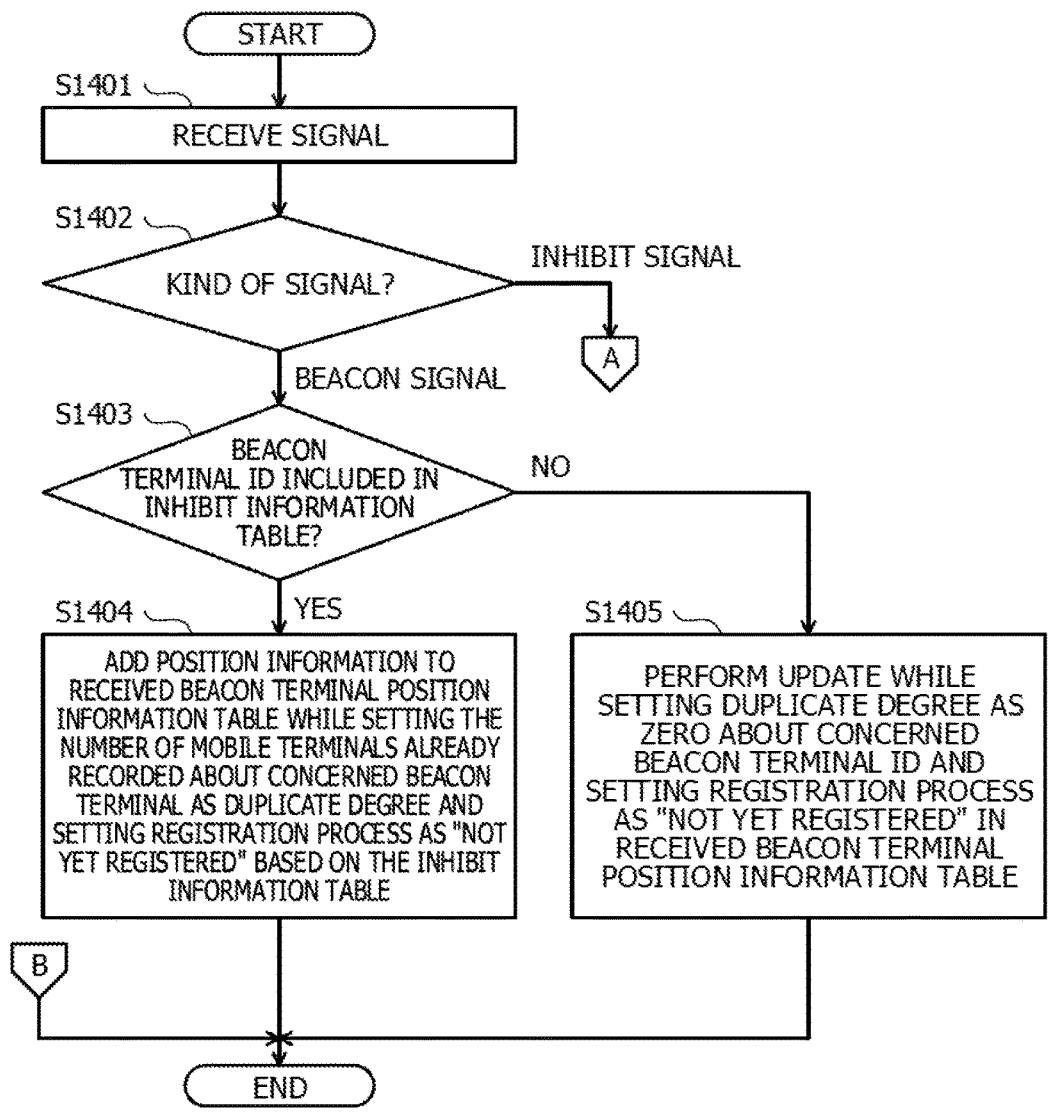
FIG. 14 is a flowchart (first) illustrating an example of signal receiving process procedures.
Figure 15:
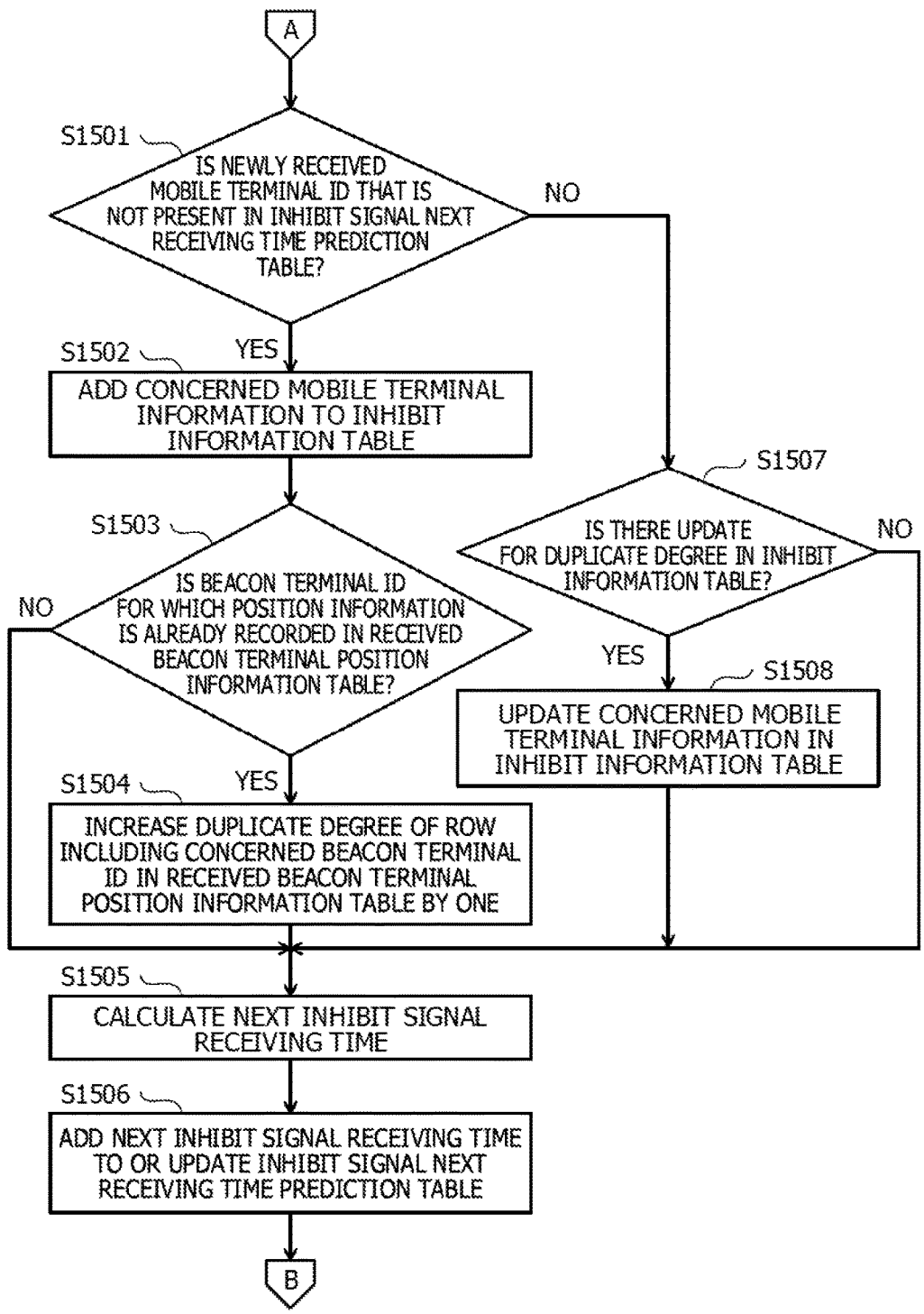
FIG. 15 is a flowchart (second) illustrating an example of signal receiving process procedures.

The beacon terminal A periodically transmits the beacon signal 701 (step S1201). Each of the mobile terminals x to z that receives the beacon signal executes a signal receiving process (step S1202). The signal receiving process is illustrated in FIG. 14 and FIG. 15. The mobile terminals x to z execute the signal receiving process and thereby update the duplicate degrees of the beacon terminal A of the subject terminals as zero. Further, the mobile terminals x to z continue to record positions in which the beacon signal 701 is received.

After the process of step S1202 is finished, in a case where the inhibit signal transmission timer 531 of the mobile terminal x expires, the mobile terminal x executes an inhibit signal transmission process and transmits the inhibit signal 702 (step S1203). The inhibit signal transmission process is described with reference to FIG. 20. As described with reference to FIG. 7, the inhibit signal 702 includes the beacon terminal ID that is received by the transmission source of the inhibit signal 702 and the duplicate degree of the transmission source of the inhibit signal 702.

Each of the mobile terminals y and z that receives the inhibit signal 702 executes the signal receiving process (step S1204). Because the mobile terminals y and z receive the inhibit signal 702 from the mobile terminal x for the first time, the mobile terminals y and z increase the duplicate degrees of the subject terminals by one. As a result of the increase, the duplicate degrees of the mobile terminals y and z themselves together become one. At the time point when the process of step S1204 is executed, the duplicate degrees of both of the mobile terminals y and z themselves are higher than the duplicate degree of the mobile terminal x. Accordingly, at this time point, in each of the mobile terminals y and z, the subject terminal is planned to become an execution subject that performs the registration request of the beacon terminal ID of the beacon terminal A.

After the process of step S1204 is finished, in a case where the inhibit signal transmission timer 531 of the mobile terminal y expires, the mobile terminal y executes the inhibit signal transmission process and transmits the inhibit signal 702 (step S1205). Here, because the mobile terminals y and z are in positions in which direct communication is not possible, as illustrated in FIG. 12, the mobile terminal x receives the inhibit signal 702 that is transmitted by the mobile terminal y, but the mobile terminal z does not receive the inhibit signal 702 that is transmitted by the mobile terminal y.

The mobile terminal x that receives the inhibit signal 702 executes the signal receiving process (step S1206). Because the mobile terminal x receives the inhibit signal 702 from the mobile terminal y for the first time, the mobile terminal x increases the duplicate degree of the subject terminal by one. As a result of the increase, the duplicate degree of the mobile terminal x itself becomes one. At the time point when the process of step S1206 is executed, in the mobile terminal x, the duplicate degree of the subject terminal matches the duplicate degree of the mobile terminal y. Accordingly, at this time point, in the mobile terminal x, the mobile terminal y is planned to become the execution subject that performs the registration request of the beacon terminal ID of the beacon terminal A, in accordance with the magnitudes of the IDs of the mobile terminals.

After the process of step S1206 is finished, in a case where the inhibit signal transmission timer 531 of the mobile terminal z expires, the mobile terminal z executes the inhibit signal transmission process and transmits the inhibit signal 702 (step S1207). Here, because the mobile terminals y and z are in positions in which direct communication is not possible, as illustrated in FIG. 12, the mobile terminal x receives the inhibit signal 702 transmitted by the mobile terminal z, but the mobile terminal y does not receive the inhibit signal 702 transmitted by the mobile terminal z.

The mobile terminal x that receives the inhibit signal 702 executes the signal receiving process (step S1208). Because the mobile terminal x receives the inhibit signal 702 from the mobile terminal z for the first time, the mobile terminal x increases the duplicate degree of the subject terminal by one. As a result of the increase, the duplicate degree of the mobile terminal x itself becomes two. At the time point when the process of step S1208 is executed, in the mobile terminal x, the duplicate degree of the subject terminal becomes higher than the duplicate degree of the mobile terminal y. Accordingly, at this time point, in the mobile terminal x, the subject terminal is planned to become the execution subject that performs the registration request of the beacon terminal ID of the beacon terminal A.

After the process of step S1208 is finished, in a case where the inhibit signal transmission timer 531 of the mobile terminal x expires, the mobile terminal x executes the inhibit signal transmission process and transmits the inhibit signal 702 (step S1209).

Each of the mobile terminals y and z that receives the inhibit signal 702 executes the signal receiving process (step S1210). Because the mobile terminals y and z already receive the inhibit signal 702 from the mobile terminal x, the mobile terminals y and z do not increase the duplicate degrees of the subject terminals. Accordingly, each of the duplicate degrees of the mobile terminals y and z themselves is maintained to be one. Then, at the time point when the process of step S1210 is executed, in both of the mobile terminals y and z, the duplicate degree of the mobile terminal x is higher than the duplicate degrees of the subject terminals. Accordingly, at this time point, in each of the mobile terminals y and z, the mobile terminal x is planned to become the execution subject that performs the registration request of the beacon terminal ID of the beacon terminal A.

After the process of step S1210 is finished, in a case where the inhibit signal transmission timer 531 of the mobile terminal y expires, the mobile terminal y executes the inhibit signal transmission process and transmits the inhibit signal 702 (step S1211).

The mobile terminal x that receives the inhibit signal 702 executes the signal receiving process (step S1212). Because the mobile terminal x already receives the inhibit signal 702 from the mobile terminal y, the mobile terminal x does not increase the duplicate degree of the subject terminal. Accordingly, the duplicate degree of the mobile terminal x itself is maintained to be two.

After the process of step S1212 is finished, in a case where the inhibit signal transmission timer 531 of the mobile terminal z expires, the mobile terminal z executes the inhibit signal transmission process and transmits the inhibit signal 702 (step S1213).

The mobile terminal x that receives the inhibit signal 702 executes the signal receiving process (step S1214). Because the mobile terminal x already receives the inhibit signal 702 from the mobile terminal z, the mobile terminal x does not increase the duplicate degree of the subject terminal. Accordingly, the duplicate degree of the mobile terminal x itself is maintained to be two.

Figure 16:
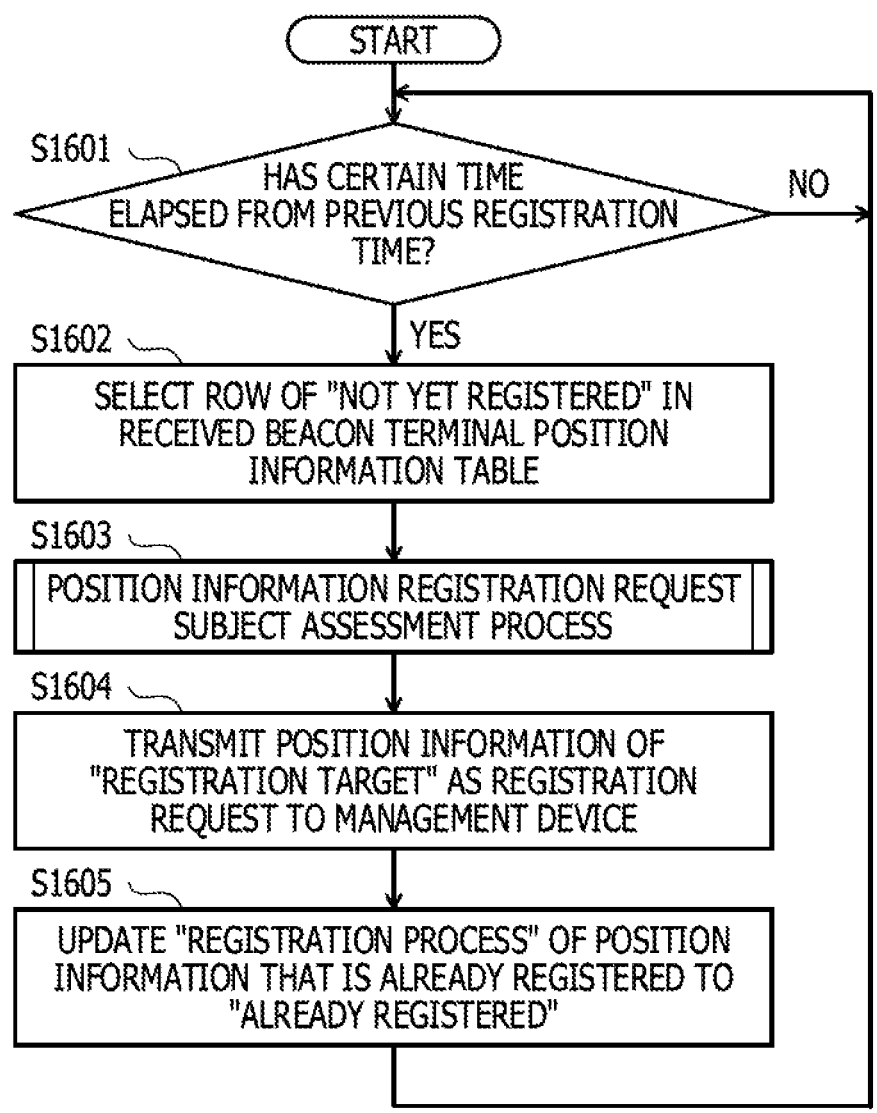
FIG. 16 is a flowchart illustrating an example of position information registration request process procedures.

Then, after the process of step S1214 is finished, in a case where the respective position information registration timers 532 of the mobile terminals x to z expire, the mobile terminals x to z execute a position information registration request process (step S1215). The position information registration request process is illustrated in FIG. 16. In the example of FIG. 12, each of the mobile terminals x to z decides that the execution subject that performs the position information registration request is the mobile terminal x. Accordingly, the mobile terminal x transmits the registration request of the beacon terminal ID of the beacon terminal A to the management device 103 (step S1216). The management device 103 that receives the registration request executes a position information registration process. The position information registration process is described with reference to FIG. 18.

Figure 13:
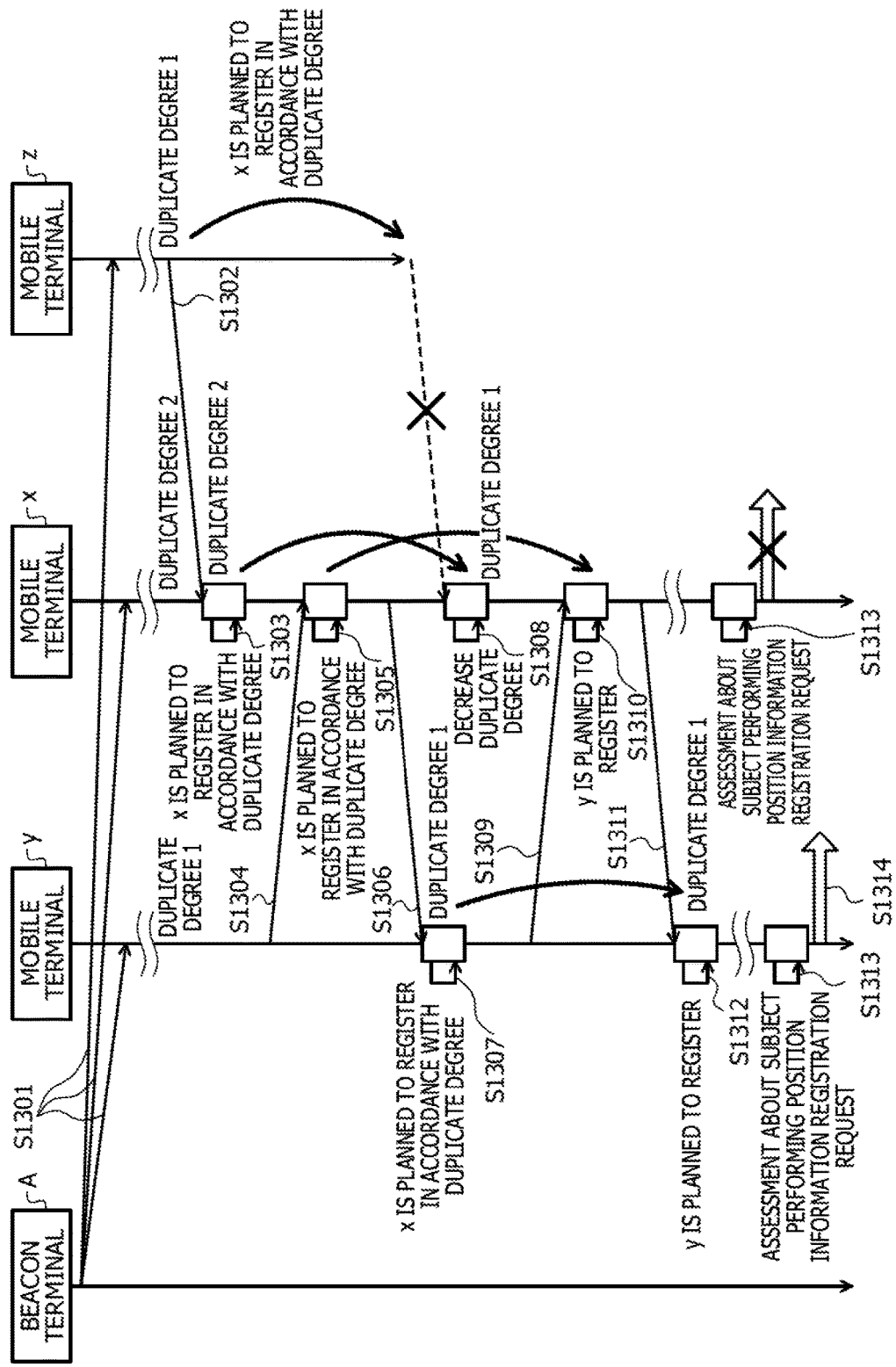
FIG. 13 is a sequence diagram illustrating an exemplary update of duplicate degrees.

FIG. 13 is a sequence diagram illustrating an exemplary update of the duplicate degrees. In FIG. 13, a description is made about an exemplary update of the duplicate degrees in a case where, from the state illustrated in FIG. 12, the mobile terminal z moves out from the signal reaching range of the mobile terminal x. In FIG. 13, similarly to FIG. 12, for simplicity of description, a description is made by using only the beacon terminal A among the beacon terminals A to C. In addition, it is assumed that the duplicate degree of the mobile terminal, which is mentioned, is the duplicate degree of the beacon terminal A in the mobile terminal.

Here, each of the mobile terminals predicts the time for receiving the next inhibit signal in a case where the inhibit signal is received from the other mobile terminal in order to assess whether or not the other mobile terminal moves out from the signal reaching range of the subject terminal. Then, in a case where the inhibit signal is not received from the other mobile terminal even after the predicted time has passed, each of the mobile terminals assesses that the other mobile terminal moves out from the signal reaching range of the subject terminal.

The beacon terminal A periodically transmits the beacon signal 701 (step S1301). Continuing to use the state illustrated in FIG. 12, the duplicate degrees of the mobile terminals x to z themselves are two, one, and one, respectively.

After the process of step S1301 is finished, in a case where the inhibit signal transmission timer 531 of the mobile terminal y expires, the mobile terminal y executes the inhibit signal transmission process and transmits the inhibit signal 702 (step S1302).

The mobile terminal x that receives the inhibit signal 702 executes the signal receiving process (step S1303). Because the mobile terminal x already receives the inhibit signal 702 from the mobile terminal z, the mobile terminal x does not increase the duplicate degree of the subject terminal. Accordingly, the duplicate degree of the mobile terminal x itself is maintained to be two.

After the process of step S1303 is finished, in a case where the inhibit signal transmission timer 531 of the mobile terminal y expires, the mobile terminal y executes the inhibit signal transmission process and transmits the inhibit signal 702 (step S1304).

The mobile terminal x that receives the inhibit signal 702 executes the signal receiving process (step S1305). Because the mobile terminal x already receives the inhibit signal 702 from the mobile terminal y, the mobile terminal x does not increase the duplicate degree of the subject terminal. Accordingly, the duplicate degree of the mobile terminal x itself is maintained to be two.

It is assumed that after the process of step S1305, the mobile terminal z moves out from the signal reaching range of the mobile terminal x. After the mobile terminal z moves out from the signal reaching range of the mobile terminal x, in a case where the inhibit signal transmission timer 531 of the mobile terminal x expires, the mobile terminal x executes the inhibit signal transmission process and transmits the inhibit signal 702 (step S1306).

The mobile terminal y that receives the inhibit signal 702 executes the signal receiving process (step S1307). Because the mobile terminal y already receives the inhibit signal 702 from the mobile terminal x, the mobile terminal y does not increase the duplicate degree of the subject terminal. Accordingly, the duplicate degree of the mobile terminal y itself is maintained to be one. At this time point, in the mobile terminal y, the mobile terminal x is planned to become the execution subject that performs the registration request of the beacon terminal ID of the beacon terminal A.

Figure 19:
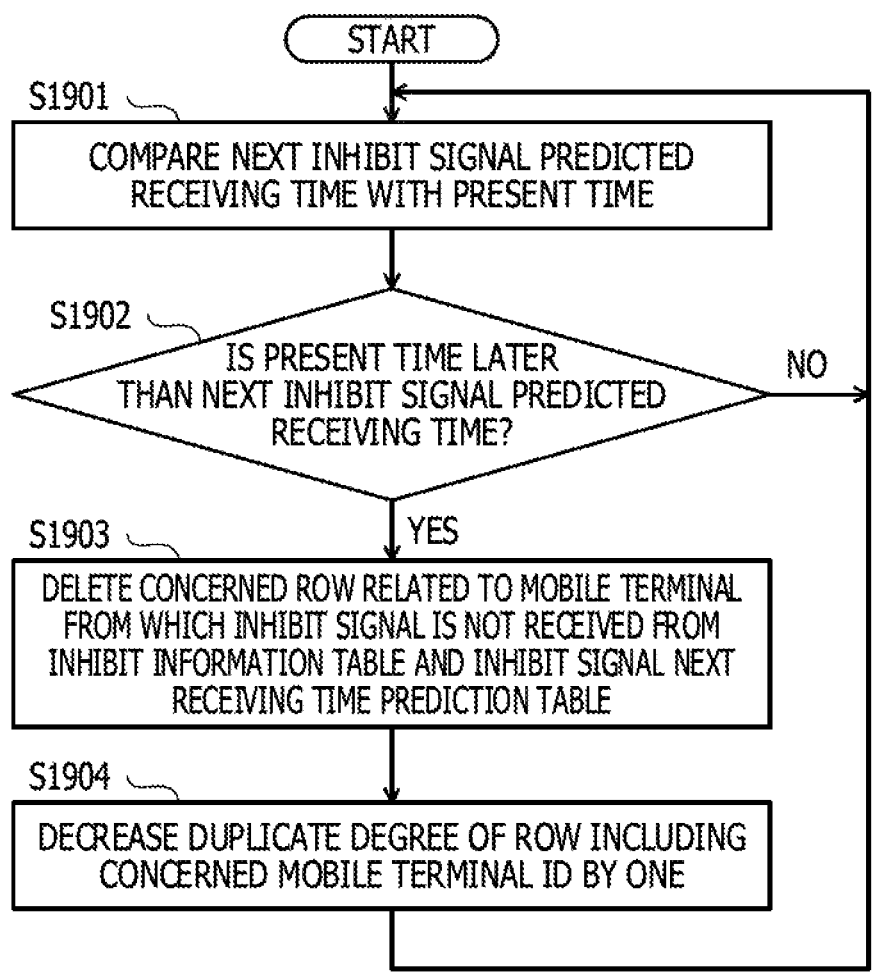
FIG. 19 is a flowchart illustrating an example of duplicate degree decreasing process procedures in Example 1.

Next, it is assumed that after the process of step S1307, the time predicted by the mobile terminal x when the mobile terminal x receives the next inhibit signal to the inhibit signal 702 from the mobile terminal z that is received in the process of step S1302 has passed. In this case, the mobile terminal x executes a duplicate degree decreasing process (step S1308). The duplicate degree decreasing process is illustrated in FIG. 19. The duplicate degree decreasing process is executed, and the duplicate degree of the mobile terminal x itself thereby becomes one.

After the process of step S1308 is finished, in a case where the inhibit signal transmission timer 531 of the mobile terminal y expires, the mobile terminal y executes the inhibit signal transmission process and transmits the inhibit signal 702 (step S1309).

The mobile terminal x that receives the inhibit signal 702 executes the signal receiving process (step S1310). Because the mobile terminal x already receives the inhibit signal 702 from the mobile terminal y, the mobile terminal x does not increase the duplicate degree of the subject terminal. Accordingly, the duplicate degree of the mobile terminal x itself is maintained to be one. At the time point when the process of step S1310 is executed, in the mobile terminal x, the duplicate degree of the subject terminal matches the duplicate degree of the mobile terminal y. Accordingly, at this time point, in the mobile terminal x, the mobile terminal y is planned to become the execution subject that performs the registration request of the beacon terminal ID of the beacon terminal A, in accordance with the magnitudes of the IDs of the mobile terminals.

After the process of step S1311 is finished, in a case where the inhibit signal transmission timer 531 of the mobile terminal x expires, the mobile terminal x executes the inhibit signal transmission process and transmits the inhibit signal 702 (step S1311).

The mobile terminal y that receives the inhibit signal 702 executes the signal receiving process (step S1312). Because the mobile terminal y already receives the inhibit signal 702 from the mobile terminal x, the mobile terminal y does not increase the duplicate degree of the subject terminal. Accordingly, the duplicate degree of the mobile terminal y itself is maintained to be one. At the time point when the process of step S1312 is executed, in the mobile terminal y, the duplicate degree of the subject terminal matches the duplicate degree of the mobile terminal x. Accordingly, at this time point, in the mobile terminal y, the subject terminal is planned to become the execution subject that performs the registration request of the beacon terminal ID of the beacon terminal A, in accordance with the magnitudes of the IDs of the mobile terminals.

Then, after the process of step S1312 is finished, in a case where the respective position information registration timers 532 of the mobile terminals x and y expire, each of the mobile terminals x and y executes the position information registration request process (step S1313). In the example of FIG. 13, each of the mobile terminals x and y decides that the execution subject that performs the position information registration request is the mobile terminal y. Accordingly, the mobile terminal y transmits the registration request of the beacon terminal ID of the beacon terminal A to the management device 103 (step S1314).

FIG. 14 is a flowchart (first) illustrating an example of signal receiving process procedures. Further, FIG. 15 is a flowchart (second) illustrating an example of signal receiving process procedures. The signal receiving process is a process for calculating the duplicate degree in a case of receiving a signal. Further, in the signal receiving process, a process for continuously recognizing how many other mobile terminals set the received beacon terminal IDs as "not yet registered" is also performed. Further, in the signal receiving process, a process for calculating a next inhibit signal receiving time from the other mobile terminal is also performed. Here, in order to assess whether the other mobile terminal still receives the beacon signal from the same beacon terminal, the mobile terminal retains the value of the duplicate degree of the other terminal until the next inhibit signal is received. The signal receiving process is executed by any of the mobile terminals w to z. However, in the description of FIG. 14 and FIG. 15, a description is made by using an example where the mobile terminal x among the mobile terminals w to z executes the signal receiving process.

The mobile terminal x receives a signal (step S1401). Next, the mobile terminal x checks the kind of the received signal (step S1402). The kinds of signals are the beacon signal 701 and the inhibit signal. In a case where the kind of the received signal is the beacon signal 701 (step S1402: beacon signal), the mobile terminal x determines whether or not the beacon terminal ID included in the received beacon signal 701 is the beacon terminal ID included in the inhibit information table 522 (step S1403). In a case where the beacon terminal ID included in the received beacon signal 701 is the beacon terminal ID included in the inhibit information table 522 (step S1403: Yes), the mobile terminal x adds the position information to the received beacon terminal position information table 521 while setting the number of the mobile terminals that are already recorded about the concerned beacon terminal as the duplicate degree and setting a registration process as "not yet registered" based on the inhibit information table 522 (step S1404).

On the other hand, in a case where the beacon terminal ID included in the received beacon signal 701 is not the beacon terminal ID included in the inhibit information table 522 (step S1403: No), the mobile terminal x performs update while setting the duplicate degree as zero about the concerned beacon terminal ID and setting the registration process as "not yet registered" in the received beacon terminal position information table 521 (step S1405). After the process of step S1404 or step S1405 is finished, the mobile terminal x finishes the signal receiving process.

Further, in a case where the kind of the received signal is the inhibit signal 702 (step S1402: inhibit signal), the mobile terminal x determines whether or not the mobile terminal ID included in the received inhibit signal 702 is a newly received mobile terminal ID that is not present in the inhibit signal next receiving time prediction table 523 (step S1501). In a case where the mobile terminal ID included in the received inhibit signal 702 is a newly received mobile terminal ID that is not present in the inhibit signal next receiving time prediction table 523 (step S1501: Yes), the mobile terminal x adds the concerned mobile terminal information to the inhibit information table 522 (step S1502). Then, the mobile terminal x determines whether or not the beacon terminal ID included in the received inhibit signal 702 is the beacon terminal ID for which the position information is already recorded in the received beacon terminal position information table 521 (step S1503).

In a case where the beacon terminal ID included in the received inhibit signal 702 is the beacon terminal ID for which the position information is already recorded in the received beacon terminal position information table 521 (step S1503: Yes), the mobile terminal x increases the duplicate degree of the row that includes the concerned beacon terminal ID in the received beacon terminal position information table 521 by one (step S1504).

After the process of step S1504 is finished or in a case where the beacon terminal ID included in the received inhibit signal 702 is not the beacon terminal for which the position information is already recorded in the received beacon terminal position information table 521 (step S1503: No), the mobile terminal x calculates the next inhibit signal receiving time (step S1505). For example, the mobile terminal x calculates the time that results from the addition of the inhibit signal transmission interval included in the inhibit signal 702 to the time when the inhibit signal 702 is received as the next inhibit signal receiving time.

Then, the mobile terminal x adds the next inhibit signal receiving time to or updates the inhibit signal next receiving time prediction table 523 (step S1506). Specifically, in a case where the concerned mobile terminal ID is not present in the inhibit signal next receiving time prediction table 523, the mobile terminal x adds the concerned mobile terminal ID and the calculated next inhibit signal receiving time as one record to the inhibit signal next receiving time prediction table 523. Further, in a case where the concerned mobile terminal ID is present in the inhibit signal next receiving time prediction table 523, the mobile terminal x updates the value of the next inhibit signal receiving time field of the record in which the concerned mobile terminal ID is stored with the calculated next inhibit signal receiving time. After the process of step S1506 is finished, the mobile terminal x finishes the signal receiving process.

On the other hand, in a case where the mobile terminal ID included in the received inhibit signal 702 is present in the inhibit signal next receiving time prediction table 523 (step S1501: No), the mobile terminal x determines whether or not there is update for the duplicate degree in the inhibit information table 522 (step S1507). Here, as a method for assessing whether or not there is update, the mobile terminal x compares the duplicate degree included in the inhibit signal 702 with the duplicate degree in the inhibit information table 522 and determines that there is update in a case where the two duplicate degrees are different values. In a case where there is update for the duplicate degree in the inhibit information table 522 (step S1507: Yes), the mobile terminal x updates the concerned mobile terminal information in the inhibit information table 522 (step S1508).

After the process of step S1508 is finished or in a case where there is not update for the duplicate degree in the inhibit information table 522 (step S1507: No), the mobile terminal x moves to the process of step S1505.

FIG. 16 is a flowchart illustrating an example of position information registration request process procedures. The position information registration request process is a process in which the registration request is periodically transmitted to the management device 103 in a case where the position information which is not yet registered is present and the subject terminal becomes the subject of the registration request. The position information registration request process is executed by any of the mobile terminals w to z. However, in the description of FIG. 16, a description is made by using an example where the mobile terminal x among the mobile terminals w to z executes the position information registration request process.

The mobile terminal x monitors the position information registration timer 532 and thereby determines whether or not a certain time has elapsed from a previous registration time (step S1601). Here, the certain time is changed in accordance with trackability of the beacon terminal that is demanded by the registration request assessment unit 506. In a case where the certain time has not elapsed from the previous registration time (step S1601: No), the mobile terminal x again executes the process of step S1601.

On the other hand, in a case where the certain time has elapsed from the previous registration time (step S1601: Yes), the mobile terminal x selects the row of "not yet registered" in the received beacon terminal position information table 521 (step S1602). Then, the mobile terminal x executes a position information registration request subject assessment process in Example 1 (step S1603). The position information registration request subject assessment process in Example 1 is illustrated in FIG. 17.

Next, the mobile terminal x transmits the position information of the "registration target" as the registration request to the management device 103 (step S1604). Then, the mobile terminal x updates the "registration process" of the position information that is already registered to "already registered" (step S1605). After the process of step S1605 is finished, the mobile terminal x moves to the process of step S1601.

Figure 17:
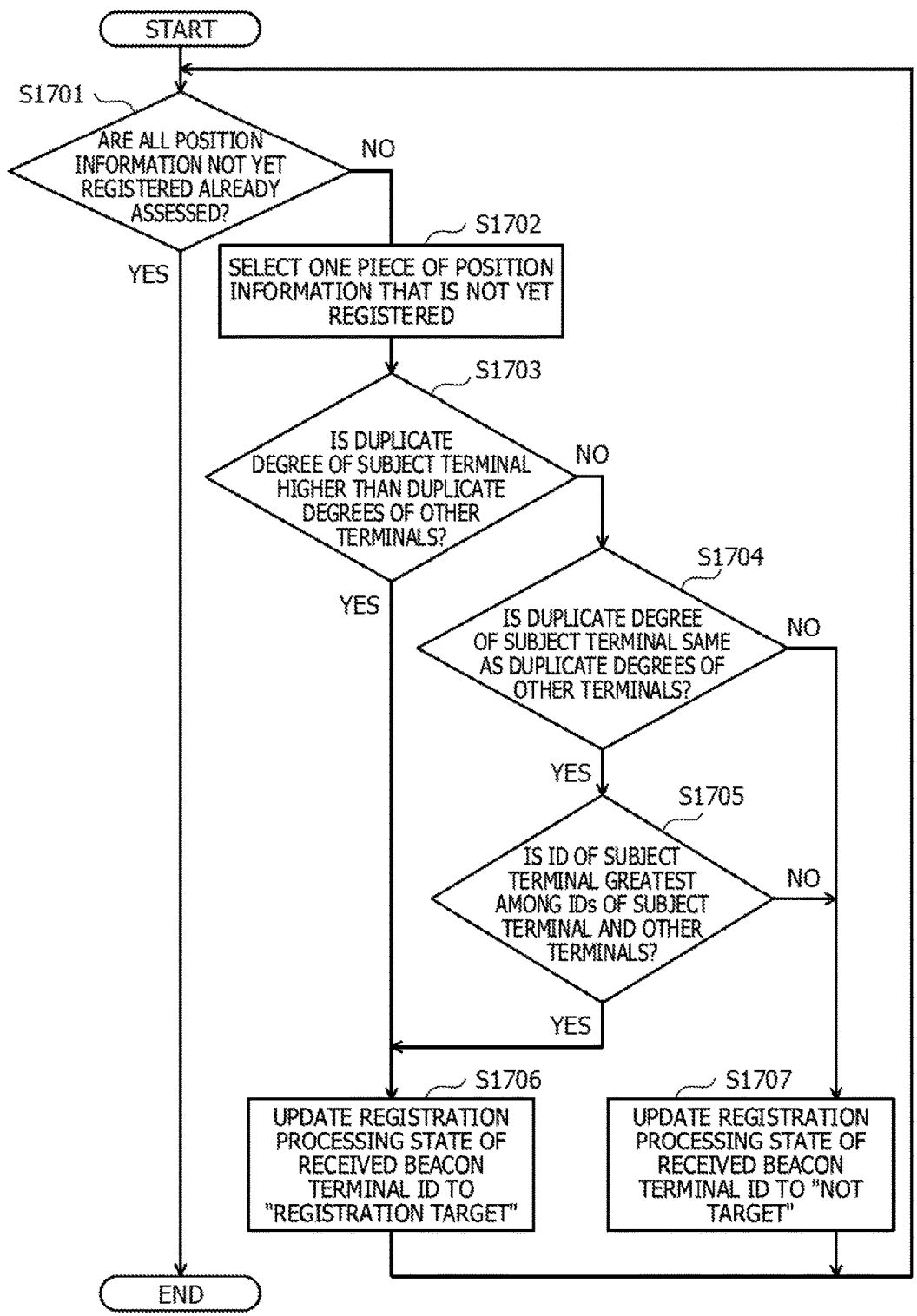
FIG. 17 is a flowchart illustrating an example of position information registration request subject assessment process procedures in Example 1.

FIG. 17 is a flowchart illustrating an example of position information registration request subject assessment process procedures in Example 1. The position information registration request subject assessment process is a process for assessing whether the subject which transmits the registration request of the position information is the subject mobile terminal or the other mobile terminal. The position information registration request subject assessment process is a process that is called from the position information registration request process. Thus, similarly to FIG. 16, a description is made by using an example where the mobile terminal x among the mobile terminals w to z executes the position information registration request subject assessment process.

The mobile terminal x determines whether or not all pieces of the position information that are not yet registered are already assessed by the processes of steps S1702 to S1707 (step S1701). In a case where the pieces of the position information that are not yet registered and assessed are present (step S1701: No), the mobile terminal x selects one piece of the position information that is not yet registered (step S1702). Next, the mobile terminal x determines whether or not the duplicate degree of the subject terminal is higher than the duplicate degrees of the other terminals (step S1703). Here, the duplicate degree of the subject terminal is stored in the received beacon terminal position information table 521. Meanwhile, the duplicate degrees of the other terminals are stored in the inhibit information table 522.

In a case where the duplicate degree of the subject terminal is equal to or lower than the duplicate degrees of the other terminals (step S1703: No), the mobile terminal x next determines whether or not the duplicate degree of the subject terminal is the same as the duplicate degrees of the other terminals (step S1704). In a case where the duplicate degree of the subject terminal is the same as the duplicate degrees of the other terminals (step S1704: Yes), the mobile terminal x next determines whether or not the ID of the subject terminal is greatest among the ID of the subject terminal and the IDs of the other terminals (step S1705).

In a case where the duplicate degree of the subject terminal is higher than the duplicate degrees of the other terminals (step S1703: Yes) or where the ID of the subject terminal is greatest (step S1705: Yes), the mobile terminal x updates the registration processing state of the received beacon terminal ID to "registration target" (step S1706).

On the other hand, in a case where the duplicate degree of the subject terminal is not equal to the duplicate degrees of the other terminals, that is, the duplicate degree of the subject terminal is lower than the duplicate degrees of the other terminals (step S1704: No) or where the ID of the other terminal is greatest (step S1705: No), the mobile terminal x updates the registration processing state of the received beacon terminal ID to "not target" (step S1707). After the process of step S1706 or step S1707 is finished, the mobile terminal x moves to the process of step S1701.

Further, in a case where all pieces of the position information that are not yet registered are already assessed by the processes of steps S1702 to S1707 (step S1701: Yes), the mobile terminal x finishes the position information registration request subject assessment process.

Figure 18:
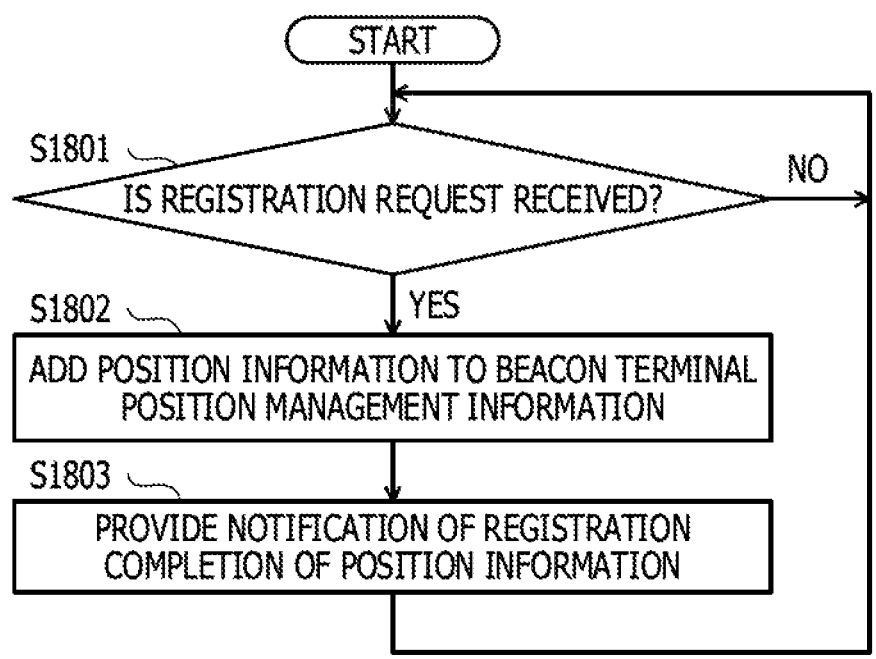
FIG. 18 is a flowchart illustrating an example of position information registration process procedures.

FIG. 18 is a flowchart illustrating an example of position information registration process procedures. The position information registration process is a process for registering the position information included in the registration request in a case where the registration request is received. The position information registration process is executed by the management device 103.

The management device 103 determines whether or not the registration request is received (step S1801). In a case where the registration request is not received (step S1801: No), the management device 103 again executes the process of step S1801.

On the other hand, in a case where the registration request is received (step S1801: Yes), the management device 103 adds the position information to beacon terminal position management information (step S1802). Then, the management device 103 provides a notification of registration completion of the position information to the transmission source of the registration request (step S1803). After the process of step S1803 is finished, the management device 103 moves to the process of step S1801.

In the process of step S1803, as the registration completion of the position information, the management device 103 may attach the content of the received registration request or the signature that ensures correctness of the transmitter of the position information, for example.

FIG. 19 is a flowchart illustrating an example of duplicate degree decreasing process procedures in Example 1. The duplicate degree decreasing process is a process for decreasing the related duplicate degree in a case where the inhibit signal 702 is not received even if the predicted time when the inhibit signal 702 is received has passed. The duplicate degree decreasing process is executed by any of the mobile terminals w to z. However, in the description of FIG. 19, a description is made by using an example where the mobile terminal x among the mobile terminals w to z executes the duplicate degree decreasing process.

The mobile terminal x compares the next inhibit signal predicted receiving time that is stored in the inhibit signal next receiving time prediction table 523 with the present time (step S1901). Then, the mobile terminal x determines whether or not the present time is later than the next inhibit signal predicted receiving time (step S1902). In a case where the present time is not later than the next inhibit signal predicted receiving time (step S1902: No), the mobile terminal x moves to the process of step S1901.

On the other hand, in a case where the present time is later than the next inhibit signal predicted receiving time (step S1902: Yes), the mobile terminal x deletes the concerned row related to the mobile terminal from which the inhibit signal is not received from the inhibit information table 522 and the inhibit signal next receiving time prediction table 523 (step S1903). Then, the mobile terminal x decreases the duplicate degree of the row that includes the concerned mobile terminal ID in the received beacon terminal position information table 521 by one (step S1904).

As described above, the duplicate degree decreasing process is executed, and the mobile terminal x thereby retains the value of the duplicate degree in the period between reception of the previous inhibit signal 702 and reception of the next inhibit signal 702. Further, the mobile terminal x again calculates the duplicate degree in a case where the inhibit signal 702 may not be received.

Figure 20:
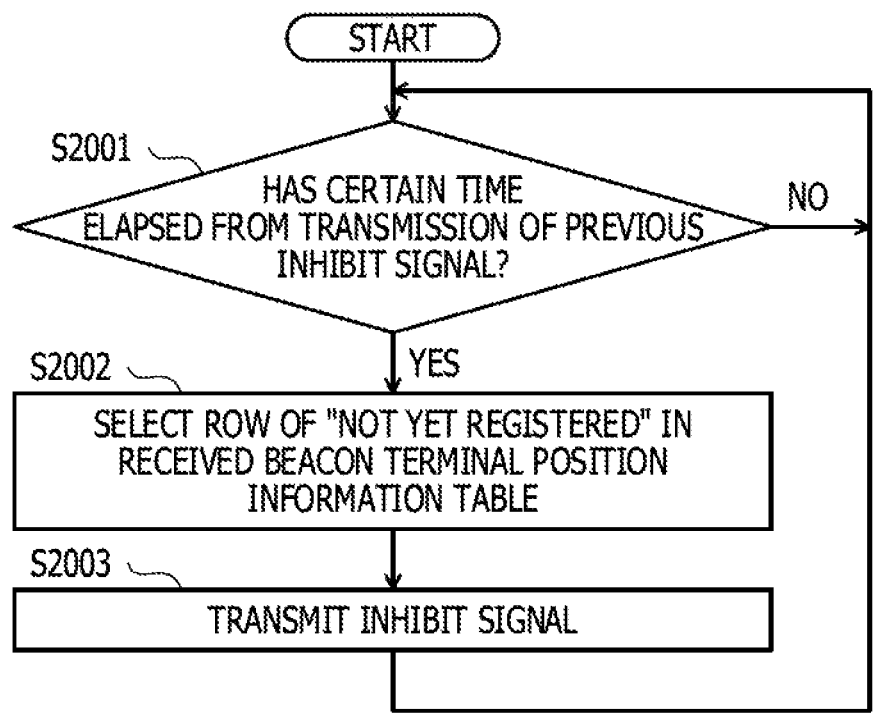
FIG. 20 is a flowchart illustrating an example of inhibit signal transmission process procedures in Example 1.

FIG. 20 is a flowchart illustrating an example of inhibit signal transmission process procedures in Example 1. The inhibit signal transmission process is a process for periodically transmitting the inhibit signal. The inhibit signal transmission process is executed by any of the mobile terminals w to z. However, in the description of FIG. 20, a description is made by using an example where the mobile terminal x among the mobile terminals w to z executes the inhibit signal transmission process.

The mobile terminal x monitors the inhibit signal transmission timer 531 and thereby determines whether or not a certain time has elapsed from transmission of the previous inhibit signal 702 (step S2001). Here, each of the mobile terminals may set the certain time in accordance with the remaining battery charge of the subject terminal. For example, the mobile terminal x may set the certain time longer as the remaining charge of the battery 321 of the subject terminal is less and may set the certain time shorter as the remaining charge of the battery 321 of the subject terminal is more.

In a case where the certain time has not elapsed from the transmission of the previous inhibit signal 702 (step S2001: No), the mobile terminal x again executes the process of step S2001. On the other hand, in a case where the certain time has elapsed from the transmission of the previous inhibit signal 702 (step S2001: Yes), the mobile terminal x selects the row of "not yet registered" in the received beacon terminal position information table 521 (step S2002). Then, the mobile terminal x transmits the inhibit signal 702 by using the short-distance radio communication interface 309 (step S2003). After the process of step S2003 is finished, the mobile terminal x moves to the process of step S2001.

Example 2

In Example 1, each of the mobile terminals performs the registration request of the position information in a period in which the inhibit signal from the other mobile terminal is not received, by the subject terminal. The reason for such an operation is because in a case where the distance between the mobile terminals becomes long and one of the mobile terminals may not receive the inhibit signal transmitted by the other mobile terminal, one of the mobile terminals deletes the duplicate degree of the other mobile terminal that is stored in the inhibit information table 522. Here, there may be a case where instead of reducing the pieces of the position information to one piece only in a period in which the inhibit signal is transmitted and received, it is also desired to reduce the pieces of the position information to one piece for each certain time interval in a case where the mobile terminals repeat approach and separation and gathering.

Here, how to set an effective time limit for inhibiting registration of the position information is difficult. For example, in a case where the above-described time limit is set simply long, the number of the mobile terminals that perform the registration requests may be reduced. However, a case may occur where the position of the beacon terminal may not be tracked. On the other hand, in a case where the above-described time limit is set simply short, the number of the mobile terminals that perform the registration requests may not be reduced.

Thus, in Example 2, the above-described time limit is set by either one of the two following methods. A first method is a method in which the timing when the duplicate degree of the other mobile terminal, which is stored in the inhibit information table 522, is deleted is set as a next planned registration request time. This method is referred to as Example 2-1. A second method is a method in which in a case where the management device 103 may accept the registration of the position at each of the certain time intervals T, the above-described timing of deletion is set as a planned registration time immediately before the time interval T has elapsed after the receiving time included in the inhibit signal 702. This method is referred to as Example 2-2. In Example 2-2, the frequency of the registration requests of the terminal whose inhibit signal 702 is inhibited may be reduced. Each of the mobile terminals may employ either one of Examples 2-1 and 2-2. In Example 2, the same reference characters are provided to portions that are similar to the ones described in Example 1, and illustration and description thereof are not made.

Next, a sequence diagram illustrating an exemplary operation for reducing the duplicate registrations in Example 2 is described with reference to FIG. 21.

Figure 21:
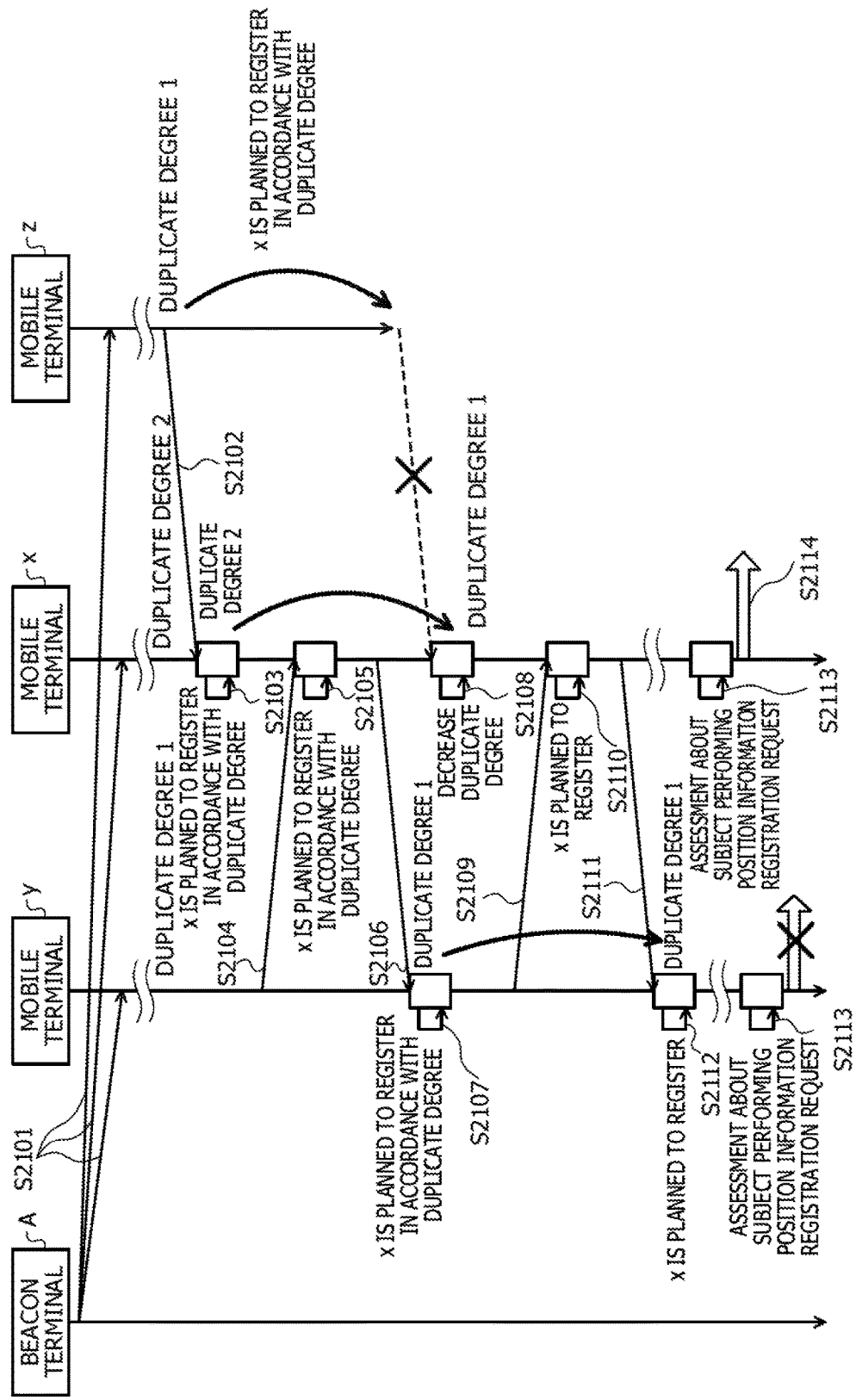
FIG. 21 is a sequence diagram illustrating an exemplary operation for reducing the duplicate registrations in Example 2.

FIG. 21 is a sequence diagram illustrating an exemplary operation for reducing the duplicate registrations in Example 2. In the state illustrated in FIG. 21, similarly to the state illustrated in FIG. 12, it is assumed that, in the first part, the mobile terminals x to z are present in the signal reaching range of the beacon terminal A and the mobile terminals y and z among the mobile terminals x to z may not directly communicate with each other. Then, a description is made about an exemplary update of the duplicate degrees in a case where the mobile terminal z moves out from the signal reaching range of the mobile terminal x.

Here, because the processes of steps S2101 to S2107 illustrated in FIG. 21 are the same as the processes of steps S1301 to S1307 illustrated in FIG. 13, a description thereof is not made.

Figure 22:
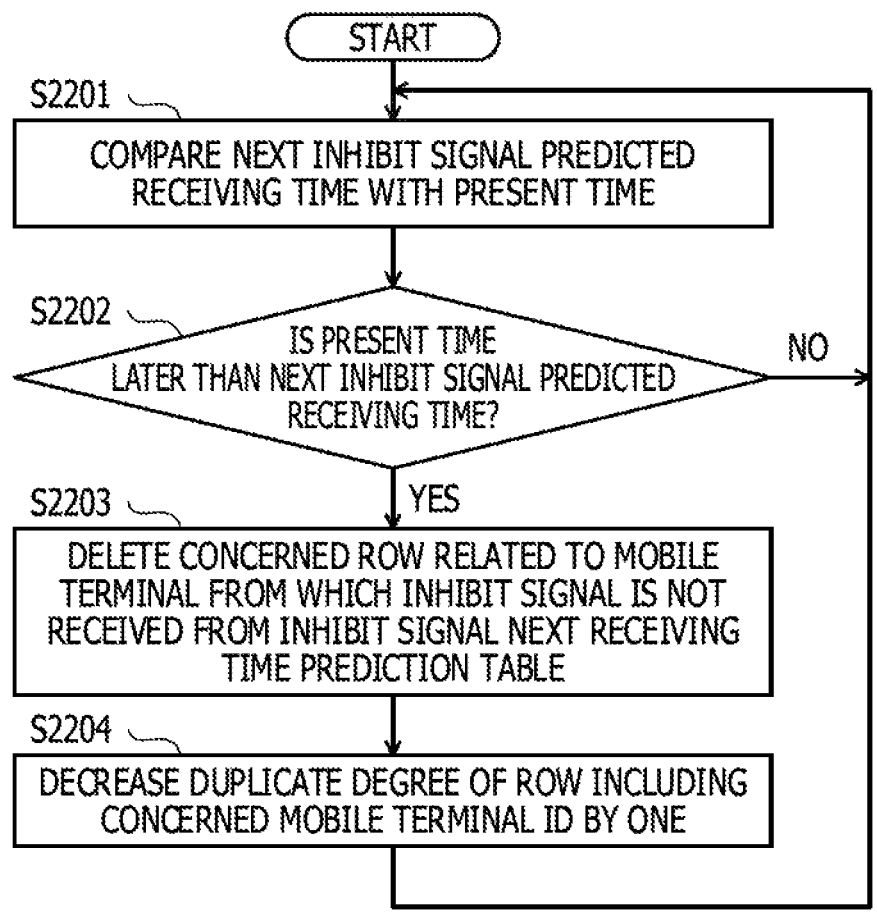
FIG. 22 is a flowchart illustrating an example of duplicate degree decreasing process procedures in Example 2.

It is assumed that after the process of step S2107, the time predicted by the mobile terminal x when the mobile terminal x receives the next inhibit signal to the inhibit signal 702 from the mobile terminal z that is received in the process of step S2102 has passed. In this case, the mobile terminal x executes a duplicate degree decreasing process in Example 2 (step S2108). The duplicate degree decreasing process in Example 2 is illustrated in FIG. 22. The duplicate degree decreasing process is executed, and the duplicate degree of the mobile terminal x itself thereby becomes one. Here, the duplicate degree is decreased. However, the mobile terminal x stores the updated duplicate degree in the received beacon terminal position information table 521 and stores two that is the old duplicate degree until assessment of the registration request of the position information is performed.

After the process of step S2108 is finished, in a case where the inhibit signal transmission timer 531 of the mobile terminal y expires, the mobile terminal y executes the inhibit signal transmission process and transmits the inhibit signal 702 (step S2109).

The mobile terminal x that receives the inhibit signal 702 executes the signal receiving process (step S2110). Because the mobile terminal x already receives the inhibit signal 702 from the mobile terminal y, the mobile terminal x does not increase the duplicate degree of the subject terminal.

After the process of step S2110 is finished, in a case where the inhibit signal transmission timer 531 of the mobile terminal x expires, the mobile terminal x executes the inhibit signal transmission process and transmits the inhibit signal 702 (step S2111).

The mobile terminal y that receives the inhibit signal 702 executes the signal receiving process (step S2112). Because the mobile terminal y already receives the inhibit signal 702 from the mobile terminal x, the mobile terminal y does not increase the duplicate degree of the subject terminal. Further, the duplicate degree of the mobile terminal x included in the inhibit signal 702 that is received in the process of the step S2111 becomes one. However, the mobile terminal y stores the updated duplicate degree in the inhibit information table 522 and stores two that is the old duplicate degree until the assessment of the registration request of the position information is performed.

Figure 23:
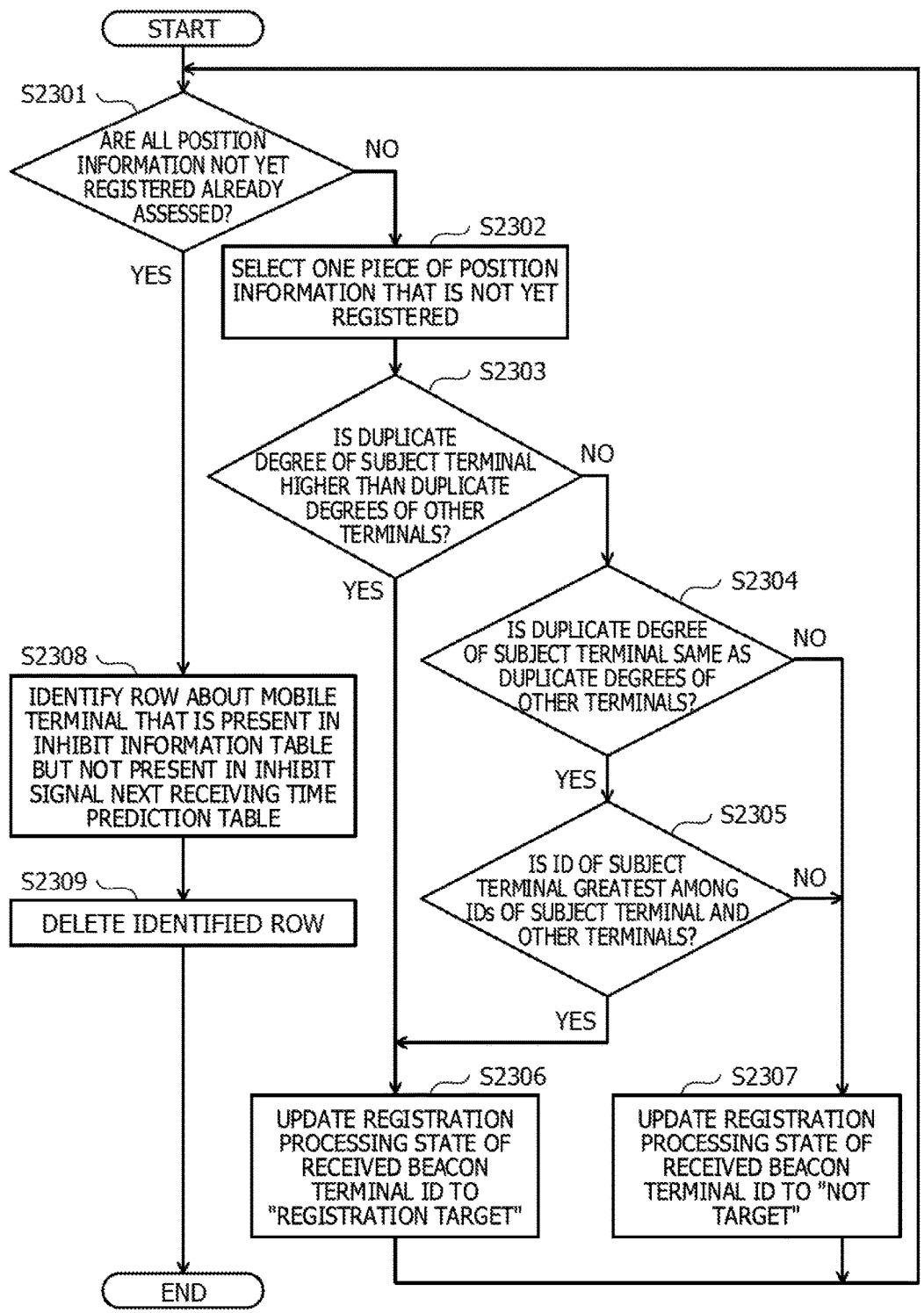
FIG. 23 is a flowchart illustrating an example of the position information registration request subject assessment process procedures in Example 2-1.
Figure 25:
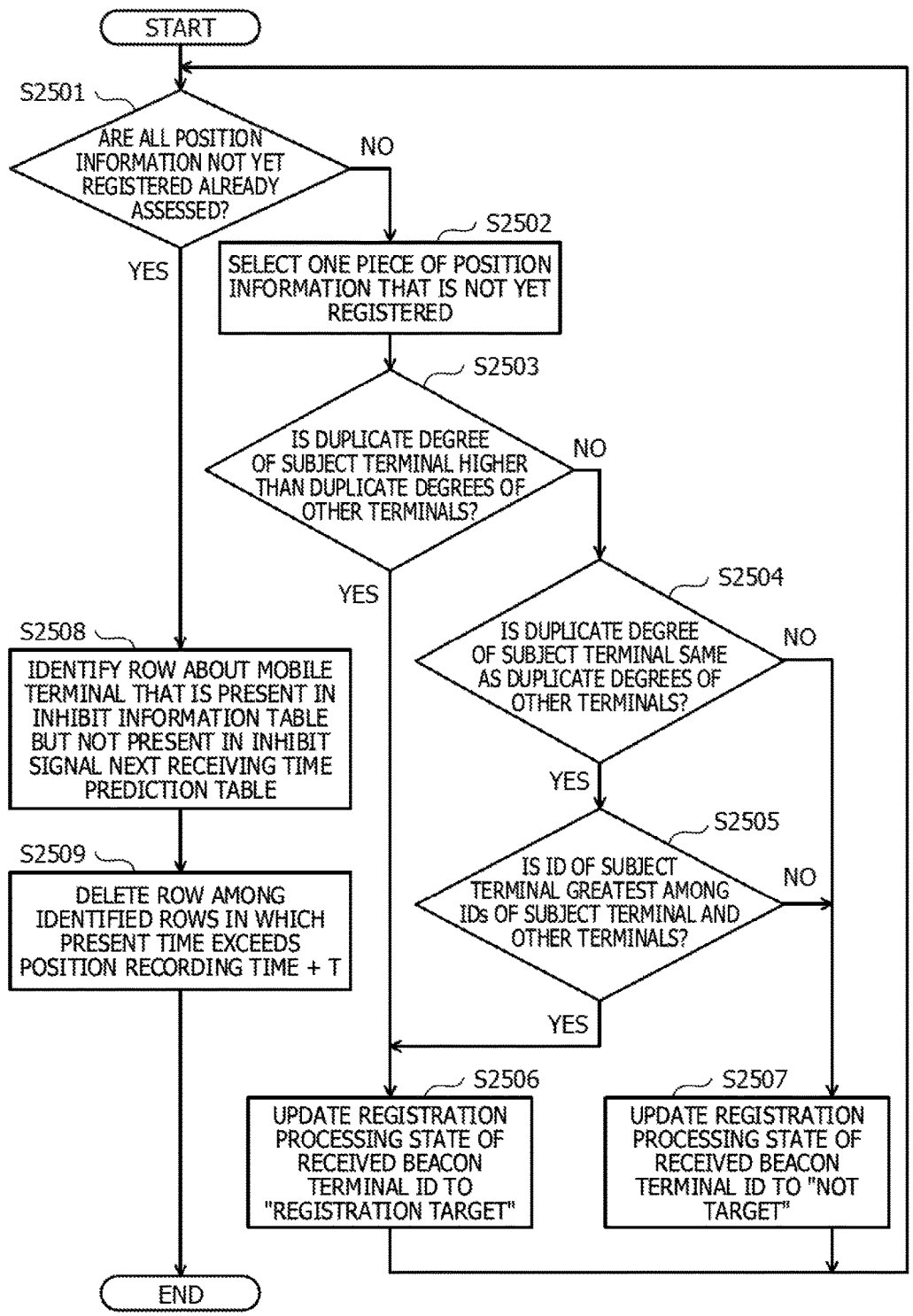
FIG. 25 is a flowchart illustrating an example of the position information registration request subject assessment process procedures in Example 2-2.

Then, after the process of step S2112 is finished, in a case where the respective position information registration timers 532 of the mobile terminals x and y expire, the mobile terminals x and y execute the position information registration request subject assessment process in Example 2-1 or the position information registration request subject assessment process in Example 2-2 (step S2113). The position information registration request subject assessment process in Example 2-1 is illustrated in FIG. 23. Further, the position information registration request subject assessment process in Example 2-2 is illustrated in FIG. 25. In the example of FIG. 21, each of the mobile terminals x and y decides that the execution subject that performs the position information registration request is the mobile terminal x based on the old duplicate degrees. Accordingly, the mobile terminal x transmits the registration request of the beacon terminal ID of the beacon terminal A to the management device 103 (step S2114). The management device 103 that receives the registration request executes the position information registration process.

FIG. 22 is a flowchart illustrating an example of duplicate degree decreasing process procedures in Example 2. The duplicate degree decreasing process in Example 2 is a process that is executed in both of Examples 2-1 and 2-2. Similarly to the duplicate degree decreasing process in Example 1, the duplicate degree decreasing process in Example 2 is executed by any of the mobile terminals w to z. However, in the description of FIG. 22, a description is made by using an example where the mobile terminal x among the mobile terminals w to z executes the duplicate degree decreasing process. Further, because steps S2201, S2202, and S2204 of the duplicate degree decreasing process illustrated in FIG. 22 are the same as the processes of steps S1901, S1902, and S1904 illustrated in FIG. 19, a description thereof is not made.

After the process of step S2202 is finished, the mobile terminal x deletes the concerned row related to the mobile terminal from which the inhibit signal is not received from the inhibit signal next receiving time prediction table 523 (step S2203). In step S2203, the deletion of the concerned row in the inhibit information table 522, which is performed in Example 1, is not performed. Further, in the process of step S2204, the mobile terminal x decreases the duplicate degree of the row that includes the concerned mobile terminal ID in the received beacon terminal position information table 521 by one but stores the duplicate degree that is not yet decreased while relating that with the concerned row.

Further, as for both of Examples 2-1 and 2-2, in the process of the step S1507, in a case where update in which the duplicate degree is decreased is performed, the duplicate degree at a time before the decrease is stored while being related with the concerned row until the position information registration request process is executed.

Example 2-1

The position information registration request subject assessment process in Example 2-1 is described with reference to FIG. 23.

FIG. 23 is a flowchart illustrating an example of the position information registration request subject assessment process procedures in Example 2-1. Similarly to the position information registration request subject assessment process in Example 1, the position information registration request subject assessment process in Example 2-1 is executed by any of the mobile terminals w to z. In the description of FIG. 23, a description is made by using an example where the mobile terminal x among the mobile terminals w to z executes the position information registration request subject assessment process.

Further, because the processes of steps S2301 to S2307 of the position information registration request subject assessment process illustrated in FIG. 23 are the same as the processes of steps S1701 to S1707 in FIG. 17, a description thereof is not made. However, as for "the duplicate degree of the subject terminal" and "the duplicate degree of the other terminal" in steps S2303 to S2305, in a case where there is the duplicate degree that is related to the concerned row in the received beacon terminal position information table 521 or the inhibit information table 522, the mobile terminal x uses the related duplicate degree.

In a case where all pieces of the position information that are not yet registered are already assessed by the processes of steps S2302 to S2307 (step S2301: Yes), the mobile terminal x identifies the row about the mobile terminal that is present in the inhibit information table 522 but not present in the inhibit signal next receiving time prediction table 523 (step S2308). Then, the mobile terminal x deletes the identified row (step S2309).

Here, the mobile terminal that is present in the inhibit information table 522 but not present in the inhibit signal next receiving time prediction table 523 is the mobile terminal that is not present in the same place. Further, in a case where the concerned row in the inhibit information table 522 is deleted and where there is the duplicate degree that is related to the concerned row, the mobile terminal x deletes the related duplicate degree. Further, in a case where the concerned row in the inhibit information table 522 is deleted and where there is the duplicate degree related to the row in the received beacon terminal position information table 521 that corresponds to the concerned row, the mobile terminal x deletes the related duplicate degree. After the process of step S2309 is finished, the mobile terminal x finishes the position information registration request subject assessment process.

Example 2-2

Next, the position information registration request subject assessment process in Example 2-2 is described with reference to FIG. 25. However, before that, because the inhibit information table in Example 2-2 changes from the inhibit information table described in Example 1, the inhibit information table in Example 2-2 is described with reference to FIG. 24.

FIG. 24 is an explanatory diagram illustrating an example of contents stored in an inhibit information table 2200 in Example 2-2. The inhibit information table 2200 in Example 2-2, which is illustrated in FIG. 24, has records 2401-1 and 2401-2.

The inhibit information table 2200 is a table in which a position recording time field is added to the inhibit information table 522. A value that represents the receiving time included in the inhibit signal 702 is stored in the position recording time field. The receiving time included in the inhibit signal 702 is, in other words, a time when the mobile terminal as the transmission source of the inhibit signal 702 receives the beacon signal 701. Further, the timing when a value is stored in the position recording time field is step S1502.

FIG. 25 is a flowchart illustrating an example of the position information registration request subject assessment process procedures in Example 2-2. Because the processes of steps S2501 to S2508 of the position information registration request subject assessment process illustrated in FIG. 25 are the same as the processes of steps S2301 to S2308 in FIG. 23, a description thereof is not made. Further, processes similar to FIG. 23 are performed for "the duplicate degree of the subject terminal" and "the duplicate degree of the other terminal" in steps S2503 to S2505.

After the process of step S2508 is finished, the mobile terminal x deletes the row among the identified rows in which the present time exceeds the position recording time+ the certain time interval T (step S2509). The certain time interval T may be decided by a manager or the like of the system 200, for example. After the process of step S2509 is finished, the mobile terminal x finishes the position information registration request subject assessment process.

Example 3

Example 3 is a method for handling a case where the mobile terminal that moves at a high speed is present and the mobile terminal that moves at a high speed and the other mobile terminal may not interchange the inhibit signals 702 due to an offset in the transmission timings of the inhibit signals 702. A case where the mobile terminal that moves at a high speed is present is illustrated in FIG. 26.

Figure 26:
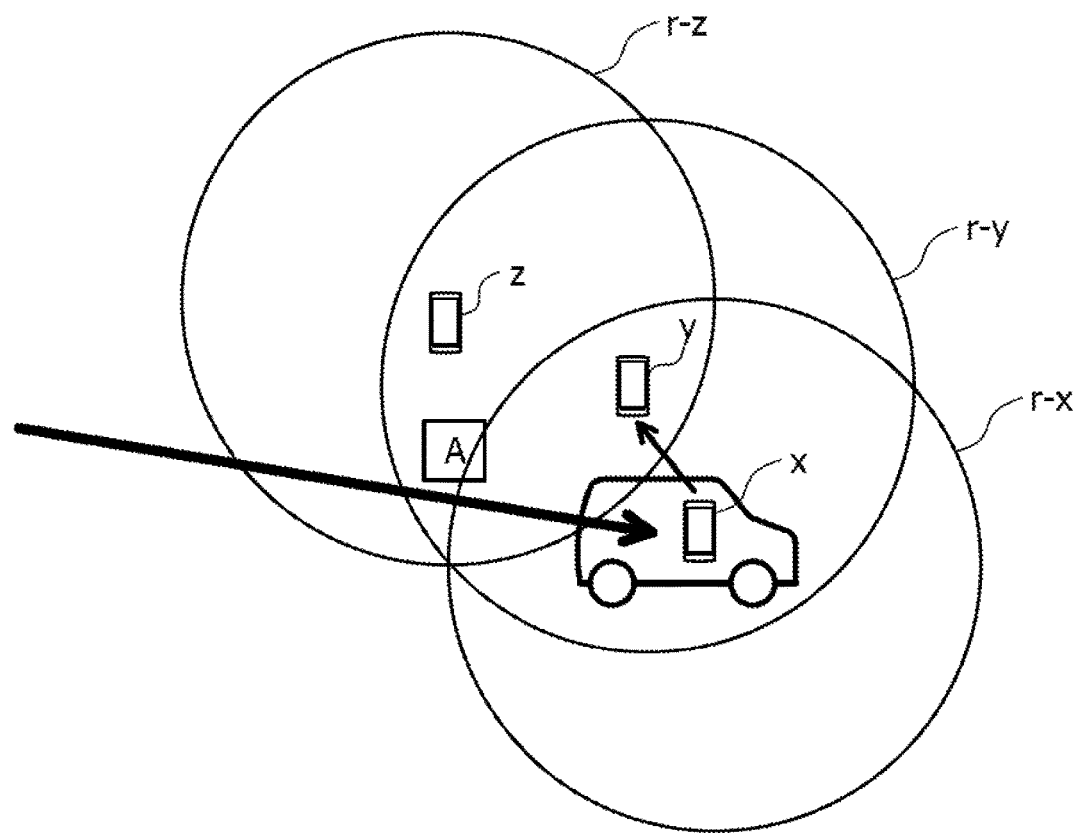
FIG. 26 is an explanatory diagram illustrating an exemplary movement of the data transfer device in Example 3.

FIG. 26 is an explanatory diagram illustrating an exemplary movement of the data transfer device in Example 3. In FIG. 26, a user who has the mobile terminal x rides in a vehicle ca. Meanwhile, users who have the mobile terminals y and z move on foot. Further, it is assumed that signal reaching ranges r-x, r-y, and r-z of the mobile terminals x, y, and z are the ranges illustrated in FIG. 26. Here, in order for the duplicate degree to be shared, the mobile terminal receives the inhibit signal 702 of the mobile terminal in a periphery and transmits the updated inhibit signal to the periphery.

However, as in FIG. 26, as a result of high speed movement of the mobile terminal x, the inhibit signal 702 of the mobile terminal x that moves at a high speed may not reach the mobile terminals y and z that are in the periphery, and the duplicate registrations may not be avoided. In a case where the mobile terminal x and one of the mobile terminals y and z may not receive the inhibit signal 702 of the other, it is possible that both of those perform the registrations.

Thus, in Example 3, in a case where the mobile terminal is present in a periphery and the mobile terminal itself moves at a certain speed or higher, it is assumed that transmission of the inhibit signal 702 and the registration request are not performed. More specifically, in Example 3, either one of the two following methods is performed. A first method is a method in which in a case where the mobile terminal receives the inhibit signal 702, the mobile terminal leaves the mobile terminal in a periphery to register the position information about the beacon terminal. This method is referred to as Example 3-1. In a second method, assessment about transmission of the inhibit signal 702 may be performed based on the change in the signal intensity of the beacon signal 701 by the beacon terminal or the mobile terminal or on the relative speed between the terminals that is obtained from the moving speeds and moving directions. This method is referred to as Example 3-2. Further, Example 3-1 or 3-2 may be carried out in combination with Example 2-1 or 2-2. In Example 3, the same reference characters are provided to portions that are similar to the ones described in Example 1, and illustration and description thereof are not made.

Next, as a common exemplary operation to Examples 3-1 and 3-2, a sequence diagram illustrating an exemplary operation for reducing the duplicate registrations in Example 3 is described with reference to FIG. 27.

Figure 27:
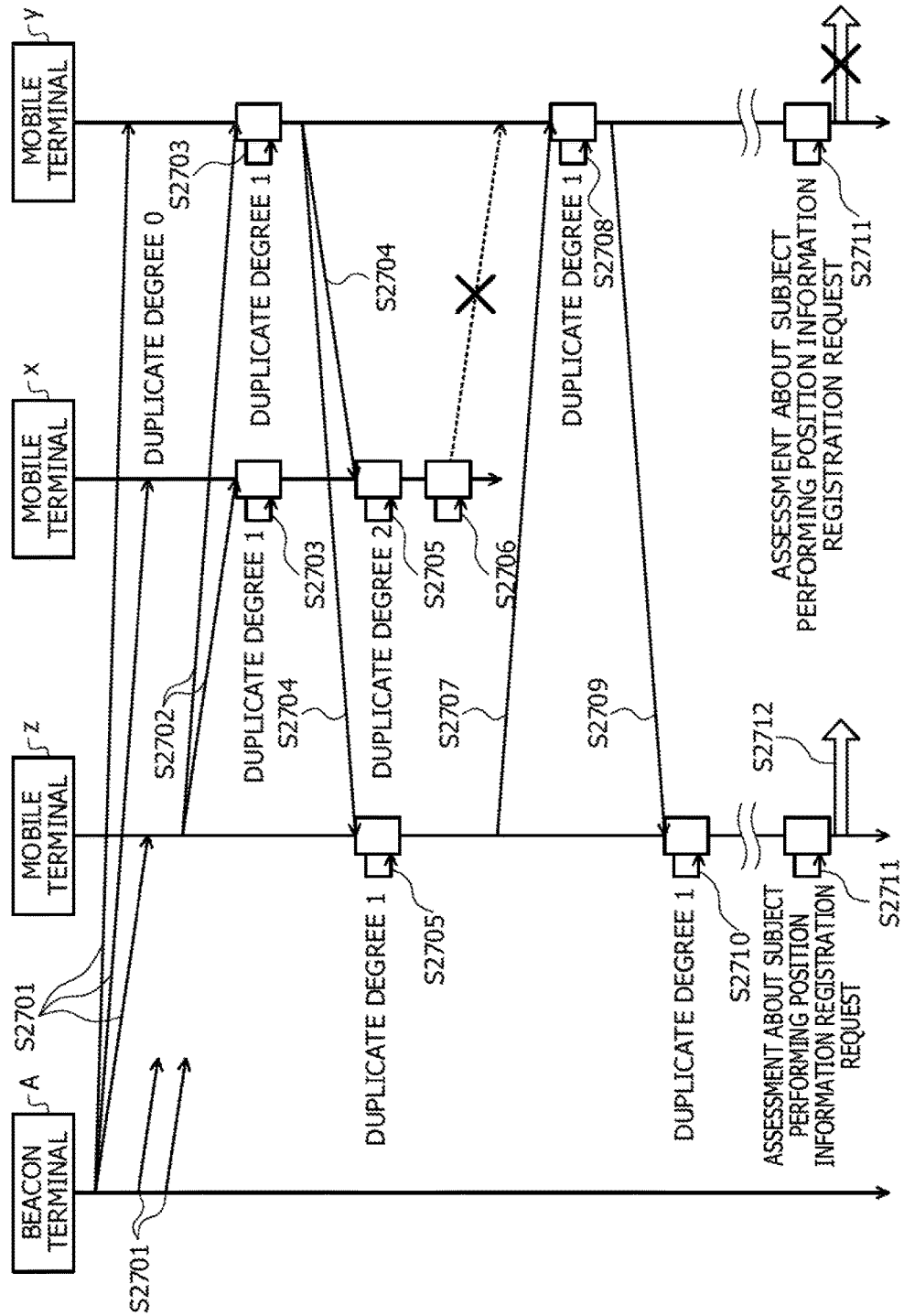
FIG. 27 is a sequence diagram illustrating an exemplary operation for reducing the duplicate registrations in Example 3.

FIG. 27 is a sequence diagram illustrating an exemplary operation for reducing the duplicate registrations in Example 3. In FIG. 27, as illustrated in FIG. 26, it is assumed that the mobile terminal x moves at a high speed with respect to the mobile terminals y and z. Further, it is assumed that at time points when the processes of steps S2701 to S2703 are executed, the mobile terminal x is included in the signal reaching ranges of the mobile terminals y and z. Specifically, describing with reference to FIG. 26, it is assumed that the mobile terminal x is included in the signal reaching ranges of the mobile terminals y and z and is present in the vicinity of the beacon terminal A. Further, it is assumed that at time points when the processes of steps S2704 to S2706 are executed, the mobile terminal x is present in the signal reaching range of the mobile terminal y but is not present in the signal reaching range of the mobile terminal z. Specifically, it is assumed that the mobile terminal x is in the position indicated in FIG. 26.

The beacon terminal A periodically transmits the beacon signal 701 (step S2701). Each of the mobile terminals x to z that receives the beacon signal executes the signal receiving process.

After the signal receiving process is finished in each of the mobile terminals x to z, in a case where the inhibit signal transmission timer 531 of the mobile terminal z expires, the mobile terminal z executes the inhibit signal transmission process and transmits the inhibit signal 702 (step S2702). Each of the mobile terminals x and y that receives the inhibit signal 702 executes the signal receiving process (step S2703). Because the mobile terminals x and y receive the inhibit signal 702 from the mobile terminal z for the first time, the mobile terminals x and y increase the duplicate degrees of the subject terminals by one. As a result of the increase, the duplicate degrees of the mobile terminals x and y themselves become one.

After the process of step S2703 is finished, in a case where the inhibit signal transmission timer 531 of the mobile terminal y expires, the mobile terminal y executes the inhibit signal transmission process and transmits the inhibit signal 702 (step S2704).

Each of the mobile terminals x and z that receives the inhibit signal 702 executes the signal receiving process (step S2705). Because the mobile terminals x and z receive the inhibit signal 702 from the mobile terminal y for the first time, the mobile terminals x and z increase the duplicate degrees of the subject terminals by one. As a result of the increase, the duplicate degrees of the mobile terminals x and z themselves becomes two and one, respectively.

After the process of step S2705 is finished, in a case where the inhibit signal transmission timer 531 of the mobile terminal x expires, the mobile terminal x executes an inhibit signal transmission process according to Example 3-1 or an inhibit signal transmission process according to Example 3-2 (step S2706). The inhibit signal transmission process according to Example 3-1 is illustrated in FIG. 28. The inhibit signal transmission process according to Example 3-2 is illustrated in FIG. 30. As a result of executing the inhibit signal transmission process according to Example 3-1 or the inhibit signal transmission process according to Example 3-2, the mobile terminal x determines that the subject terminal moves at a certain speed or higher and does not transmit the inhibit signal 702.

After the process of step S2706 is finished, in a case where the inhibit signal transmission timer 531 of the mobile terminal z expires, the mobile terminal z executes the inhibit signal transmission process and transmits the inhibit signal 702 (step S2707).

The mobile terminal y that receives the inhibit signal 702 executes the signal receiving process (step S2708). Because the mobile terminal y already receives the inhibit signal 702 from the mobile terminal z, the mobile terminal y does not increase the duplicate degree of the subject terminal. Accordingly, the duplicate degree of the mobile terminal y itself is maintained to be one.

After the process of step S2708 is finished, in a case where the inhibit signal transmission timer 531 of the mobile terminal y expires, the mobile terminal y executes the inhibit signal transmission process and transmits the inhibit signal 702 (step S2709).

The mobile terminal z that receives the inhibit signal 702 executes the signal receiving process (step S2710). Because the mobile terminal z already receives the inhibit signal 702 from the mobile terminal y, the mobile terminal z does not increase the duplicate degree of the subject terminal. Accordingly, the duplicate degree of the mobile terminal z itself is maintained to be one.

Then, after the process of step S2710 is finished, in a case where the respective position information registration timers 532 of the mobile terminals y and z expire, each of the mobile terminals y and z executes the position information registration request process (step S2711). In the example of FIG. 27, each of the mobile terminals x and y decides that the execution subject that performs the position information registration request is the mobile terminal z. Accordingly, the mobile terminal z transmits the registration request of the beacon terminal ID of the beacon terminal A to the management device 103 (step S2712).

Example 3-1

The inhibit signal transmission process in Example 3-1 is described with reference to FIG. 28.

FIG. 28 is a flowchart illustrating an example of inhibit signal transmission process procedures in Example 3-1. Similarly to the inhibit signal transmission process in Example 1, the inhibit signal transmission process in Example 3-1 is executed by any of the mobile terminals w to z. In the description of FIG. 28, a description is made by using an example where the mobile terminal x among the mobile terminals w to z executes the inhibit signal transmission process.

Further, because the processes of steps S2801 and S2802 of the inhibit signal transmission process illustrated in FIG. 28 are the same as the processes of steps S2001 and S2002 in FIG. 20, a description thereof is not made.

After the process of step S2802 is finished, the mobile terminal x calculates the moving speed of the subject terminal based on the value that is obtained from the acceleration sensor 310 (step S2803). Then, the mobile terminal x determines whether or not the moving speed of the subject terminal is equal to or lower than a predetermined threshold (step S2804). Here, as for the threshold, the mobile terminal x calculates the predetermined threshold based on the reaching distance of the inhibit signal 702 or the transmission interval of the inhibit signal 702, for example. As an example, in order to determine whether the speed enables three or more interchanges to be performed in the signal reaching range, the mobile terminal x may calculate (the reaching distance of the inhibit signal 702×2)/(the transmission interval of the inhibit signal 702×3) as the predetermined threshold.

In a case where the moving speed of the subject terminal is equal to or lower than the predetermined threshold (step S2804: Yes), the mobile terminal x transmits the inhibit signal that includes the moving speed of the subject terminal (step S2805). Then, the mobile terminal x moves to the process of step S2801. On the other hand, in a case where the moving speed of the subject terminal is higher than the predetermined threshold (step S2804: No), the mobile terminal x moves to the process of step S2801.

Example 3-2

Next, the inhibit signal transmission process in Example 3-2 is described with reference to FIG. 30. However, before that, because the inhibit signal next receiving time prediction table in Example 3-2 changes from the inhibit signal next receiving time prediction table described in Example 1, the inhibit signal next receiving time prediction table in Example 3-2 is described with reference to FIG. 29.

FIG. 29 is an explanatory diagram illustrating an example of contents stored in an inhibit signal next receiving time prediction table 2900 in Example 3-2. The inhibit signal next receiving time prediction table 2900 in Example 3-2, which is illustrated in FIG. 29, has records 2901-1 and 2901-2.

The inhibit signal next receiving time prediction table 2900 is a table in which a moving speed field is added to the inhibit signal next receiving time prediction table 523. A value that represents the moving speed of the mobile terminal which is indicated by the mobile terminal ID field is stored in the moving speed field. Here, it is assumed that the moving speed of the mobile terminal that is indicated by the mobile terminal ID field is included in the inhibit signal 702. Accordingly, it is assumed that the inhibit signal 702 in Example 3-2 includes the moving speed. Further, the timing when a value is stored in the moving speed field is step S1502 or step S1206.

FIG. 30 is a flowchart illustrating an example of inhibit signal transmission process procedures in Example 3-2. Because the processes of steps S3001 to S3003, S3005, and S3006 of the inhibit signal transmission process illustrated in FIG. 30 are the same as the processes of steps S2801 to S2805 in FIG. 28, a description thereof is not made.

After the process of step S3003 is finished, the mobile terminal x refers to the inhibit signal next receiving time prediction table and calculates the predetermined threshold from the speeds of the mobile terminals in the periphery (step S3004). For example, the mobile terminal x calculates the predetermined threshold based on the relative speeds of the other mobile terminals that are present in the periphery or the average value or absolute value of the vectors of the moving speeds. For example, the mobile terminal x calculates the average value of the moving speeds as the predetermined threshold. Further, the speed of the mobile terminal in the periphery may be a vector that has a magnitude and a direction or may be a scaler that has only a magnitude. After the process of step S3004 is finished, the mobile terminal x moves to the process of step S3005.

As described in the foregoing, the mobile terminals w to z transmit the inhibit signal 702 to each other, and the mobile terminal whose duplicate degree is highest registers the position to the management device 103. Accordingly, because the mobile terminal is closer to the beacon terminal as the duplicate degree is higher, the closest position to the beacon terminal may be notified. Therefore, the accuracy of the position information of the beacon terminals that are managed by the management device 103 may be secured. Further, the mobile terminals w to z may perform reduction in the communication amount because one terminal transmits the registration request.

Further, in a case where the next inhibit signal is not received even if the time for receiving the next inhibit signal has passed, the mobile terminals w to z may decrease the duplicate degrees of the subject terminals. Accordingly, in a case where the other terminal that has been present close to the subject terminal moves away and the duplicate degree of the other terminal becomes higher than the subject terminal, for example, the mobile terminals w to z do not perform the registration request, and the reduction in the communication amount may thus be performed.

Further, as Example 2, in a case where the next inhibit signal is not received and after the duplicate degree of the subject terminal is compared with the duplicate degree of the other terminal, the mobile terminals w to z may decrease the duplicate degrees of the subject terminals. Accordingly, for example, in Example 2-1, in a case where the duplicate degree of the subject terminal is higher than the duplicate degree of the other terminal, even if the other mobile terminals separate and gather, the mobile terminals w to z themselves perform the registration requests about the next registration request to the separation and gathering, and the other terminals may thus not perform the registration request. Further, in Example 2-2, in a case where the duplicate degree of the subject terminal is higher than the duplicate degree of the other terminal, even if the other mobile terminals separate and gather, the mobile terminals w to z themselves perform the registration requests until the time interval T is reached after the other mobile terminal receives the beacon signal, and the other terminals may thus not perform the registration request.

Further, comparing Examples 2-1 and 2-2, Example 2-1 enables transmission of further real-time position information to the management device 103 compared to Example 2-2. Further, Example 2-2 enables reduction in the transmission frequency of the registration requests by the mobile terminal that is continuously subject to inhibition compared to Example 2-1.

Further, as Example 3-1, the mobile terminals w to z may not transmit the inhibit signal in a case where the moving speed of the subject terminal is higher than the predetermined threshold. Accordingly, the mobile terminals w to z may restrain duplication of the registration requests that occurs because the inhibit signals may not be interchanged in a case where the subject terminal moves at a high speed.

Further, as Example 3-2, the mobile terminals w to z may calculate the predetermined threshold based on the moving speed of the other terminal. For example, as for the mobile terminals w to z, in a case where the subject terminal and the other terminal move at the same speed, that is, move in the same direction and at the same speed, a state where the inhibit signals may not be interchanged does not occur. Further, in this case, because the moving speed of the subject terminal is equal to or lower than the predetermined threshold, the mobile terminals w to z may restrain duplication of the registration requests similarly to the method described in Example 1.

Further, in a case where the duplicate degree of the subject terminal is the same as the duplicate degree of the other terminal, the mobile terminals w to z may transmit the registration request in a case where the ID of the subject terminal is greater than the ID of the other terminal. Accordingly, the mobile terminals w to z may restrain duplication of the registration requests even if the duplicate degree of the subject terminal is the same as the duplicate degree of the other terminal.

Further, the sensor 102 illustrated in FIG. 1 may be a beacon terminal that sends the identification information of the sensor 102 as the information about the position of the sensor 102. Accordingly, the system 100 may provide a service of monitoring the present location of the sensor 102. Further, the sensor 102 is not limited to a beacon terminal. For example, the sensor 102 may be an acceleration sensor or a temperature sensor, and the sensor 102 may send the ID of the sensor 102 itself and the acceleration or the temperature. Accordingly, the system 100 may provide a service of obtaining the present location of the sensor 102 and the moving speed of a holder of the sensor 102 or the temperature around the sensor 102.

Note that the data transfer method that has been described in the embodiments may be realized by executing a program that is in advance prepared by a computer such as a personal computer or a workstation. The data transfer program is recorded in a computer-readable recording medium such as a hard disk, a flexible disk, a compact disc read only memory (CD-ROM), or digital versatile disk (DVD) and is executed by being read out from the recording medium by a computer. Further, the data transfer program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing a data transfer program that causes a first computer to execute a process, the first computer being a computer among plural computers configured to communicate with a management device, communicate with a sensor via a short-distance radio communication, communicate with one or more of second computers among the plural computers via short-distance radio communication, the process comprising:

executing a first process that includes receiving a first signal from any of the one or more of second computers, the first signal including a first identification and a second identification, the first identification indicating the sensor, the second identification indicating the any of the one or more of second computers, each of the one or more of second computers being configured to transmit the first signal when the each of the one or more of second computers receives a sensor signal from the sensor, the sensor signal including the first identification of the sensor;

executing a second process that includes calculating, for the sensor being indicated by the first identification in the received first signal, a first duplicate degree within a predetermined time period by counting a transmission source of the first signal received within the predetermined time period, the transmission source being indicated by the second identification in the received first signal;

executing a third process that includes transmitting a second signal that includes a third identification and the first duplicate degree, the third identification indicating the first computer;

executing a fourth process that includes receiving a third signal from the any of the one or more of second computers, the third signal including a second duplicate degree, each of the one or more of second computers is configured to receive the first signal from the plural computers and the second signal from the first computer, calculate the second duplicate degree by counting the transmission source of the first signal and the second signal received within the predetermined time period, and transmit the third signal; and executing a fifth process that includes transmitting a fourth signal to the management device when the first duplicate degree is greater than the second duplicate degree, the fourth signal including the first identification and location information with respect to the first computer.

2. The non-transitory computer-readable storage medium according to claim 1, wherein
   the first signal further includes information that indicates a time interval for transmitting the first signal, and
   the second process is further configured to decrease the first duplicate degree when a first condition is met, the first condition being configured to be met when the first signal is not received from any of the one or more of second computers after a first time passes from a previous reception time of the first signal, the first signal being determined based on the time interval included in the first signal.

3. The non-transitory computer-readable storage medium according to claim 2, wherein the second process is further configured to decrease the first duplicate degree calculated when both of the first condition and a second condition are met, the second condition being configured to be met after the first duplicate degree is compared with the second duplicate degree by the fifth process.

4. The non-transitory computer-readable storage medium according to claim 1, wherein the second process includes stopping transmission of the inhibit signal in a case where a moving speed of the first computer is higher than a predetermined threshold.

5. The non-transitory computer-readable storage medium according to claim 4,
   wherein the inhibit signal that is transmitted by the second process further includes the moving speed of the transmission source of the inhibit signal, and
   wherein the second process includes receiving the inhibit signal that is output from the second computer and calculating the predetermined threshold based on the moving speed that is included in the inhibit signal.

6. The non-transitory computer-readable storage medium according to claim 1, wherein the fourth process includes transmitting the position information that is included in the sensor information to the management device in a case where the duplicate degree that is included in the sensor information and the duplicate degree that is associated with the transmission source of the inhibit signal which is received from the second computer are a same value and where a value that is indicated by identification information of the first computer is higher than a value that is indicated by identification information of the transmission source.

7. The non-transitory computer-readable storage medium according to claim 1, wherein the first process includes receiving, as the reception of the identification information of the sensor, an electric wave from a beacon terminal that sends the identification information of the sensor.

8. A data transfer device comprising:
   communication circuitry configured to communicate with a management device, communicate with a sensor via a short-distance radio communication, communicate with one or more of second computers among plural computers via short-distance radio communication; and
   a processor coupled the communication circuitry and configured to execute a first process that includes receiving a first signal from any of the one or more of second computers, the first signal including a first identification and a second identification, the first identification indicating the sensor, the second identification indicating the any of the one or more of second computers, each of the one or more of second computers being configured to transmit the first signal when the each of the one or more of second computers receives a sensor signal from the sensor, the sensor signal including the first identification of the sensor;

execute a second process that includes calculating, for the sensor being indicated by the first identification in the received first signal, a first duplicate degree within a predetermined time period by counting a transmission source of the first signal received within the predetermined time period, the transmission source being indicated by the second identification in the received first signal;

execute a third process that includes transmitting a second signal that includes a third identification and the first duplicate degree, the third identification indicating the first computer;

execute a fourth process that includes receiving a third signal from the any of the one or more of second computers, the third signal including a second duplicate degree, each of the one or more of second computers is configured to receive the first signal from the plural computers and the second signal from the first computer, calculate the second duplicate degree by counting the transmission source of the first signal and the second signal received within the predetermined time period, and transmit the third signal; and executing a fifth process that includes transmitting a fourth signal to the management device when the first duplicate degree is greater than the second duplicate degree, the fourth signal including the first identification and location information with respect to the first computer.

9. A data transfer method performed by a first computer among plural computers configured to communicate with a management device, communicate with a sensor via a short-distance radio communication, communicate with one or more of second computers among the plural computers via short-distance radio communication, and identify present positions, the method comprising:

executing, by a processor of the first computer, a first process that includes receiving a first signal from any of the one or more of second computers, the first signal including a first identification and a second identification, the first identification indicating the sensor, the second identification indicating the any of the one or more of second computers, each of the one or more of second computers being configured to transmit the first signal when the each of the one or more of second computers receives a sensor signal from the sensor, the sensor signal including the first identification of the sensor;

executing, by the processor of the first computer, a second process that includes calculating, for the sensor being indicated by the first identification in the received first signal, a first duplicate degree within a predetermined time period by counting a transmission source of the first signal received within the predetermined time period, the transmission source being indicated by the second identification in the received first signal;

executing, by the processor of the first computer, a third process that includes transmitting a second signal that includes a third identification and the first duplicate degree, the third identification indicating the first computer;

executing, by the processor of the first computer, a fourth process that includes receiving a third signal from the any of the one or more of second computers, the third signal including a second duplicate degree, each of the one or more of second computers is configured to receive the first signal from the plural computers and the second signal from the first computer, calculate the second duplicate degree by counting the transmission source of the first signal and the second signal received within the predetermined time period, and transmit the third signal; and executing a fifth process that includes transmitting a fourth signal to the management device when the first duplicate degree is greater than the second duplicate degree, the fourth signal including the first identification and location information with respect to the first computer.

* * * * *